(12) United States Patent
Raffa et al.

(10) Patent No.: US 10,052,972 B2
(45) Date of Patent: Aug. 21, 2018

(54) VEHICULAR OCCUPANCY ASSESSMENT

(71) Applicant: Intel Corporation, Santa Clara, CA (US)

(72) Inventors: Giuseppe Raffa, Portland, OR (US); Chieh-Yih Wan, Beaverton, OR (US); Sangita R. Sharma, Portland, OR (US); Lama Nachman, San Francisco, CA (US); David L. Graumann, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 985 days.

(21) Appl. No.: 13/850,900

(22) Filed: Mar. 26, 2013

(65) Prior Publication Data
US 2014/0297220 A1 Oct. 2, 2014

(51) Int. Cl.
G01D 11/00 (2006.01)
B60N 2/00 (2006.01)
B60R 16/037 (2006.01)
G07C 9/00 (2006.01)

(52) U.S. Cl.
CPC ............ B60N 2/002 (2013.01); B60R 16/037 (2013.01); G07C 9/00111 (2013.01)

(58) Field of Classification Search
CPC .. B60N 2/002; G07C 9/00031; B60R 16/037; G01C 15/00; G01C 21/20
See application file for complete search history.

(56) References Cited

U.S. PATENT DOCUMENTS

| 5,890,085 | A | 3/1999 | Corrado et al. |
| 6,026,340 | A | 2/2000 | Corrado et al. |
| 6,252,240 | B1 | 6/2001 | Gillis et al. |
| 6,272,411 | B1 | 8/2001 | Corrado et al. |
| 2003/0222440 | A1 | 12/2003 | Basir et al. |
| 2008/0143085 | A1* | 6/2008 | Breed ............... B60R 21/01516 280/735 |
| 2008/0215209 | A1 | 9/2008 | Hirotane et al. |
| 2010/0161271 | A1* | 6/2010 | Shah ..................... A61B 5/112 702/141 |
| 2010/0201505 | A1 | 8/2010 | Souroush et al. |
| 2012/0296492 | A1 | 11/2012 | Yurievitch et al. |

(Continued)

FOREIGN PATENT DOCUMENTS

| CN | 1150407 | 5/1997 |
| CN | 101743576 | 6/2010 |
| JP | 2003312391 | 6/2003 |

(Continued)

OTHER PUBLICATIONS

International Search Report and Written Opinion received for PCT Patent Application No. PCT/US2014/031686, dated Jul. 14, 2014, 15 pages.

(Continued)

Primary Examiner — Mohamed Charioui
Assistant Examiner — Jeremy Delozier
(74) Attorney, Agent, or Firm — Eversheds Sutherland (US) LLP

(57) ABSTRACT

Systems, devices, and techniques are provided for occupancy assessment of a vehicle. For one or more occupants of the vehicle, the occupancy assessment establishes position and/or identity for some or all of the occupant(s).

15 Claims, 15 Drawing Sheets

(56) References Cited

U.S. PATENT DOCUMENTS

2014/0195477 A1* 7/2014 Graumann ......... G06K 9/00369
707/609

FOREIGN PATENT DOCUMENTS

| JP | 2003312291 | 11/2003 |
|---|---|---|
| JP | 2007114988 | 5/2007 |
| JP | 2007114988 | 10/2007 |
| WO | 9849031 | 11/1998 |
| WO | 2014/160684 A1 | 10/2014 |

OTHER PUBLICATIONS

Office Action from Japanese Application No. 2015-559323 dated Aug. 2, 2016. (5 pgs., including 2 pgs. translation).
Office Action from Chinese Application No. 201480010581.5 dated Aug. 3, 2016. (14 pgs., including 9 pgs. translation).
Extended Search Report for European Application No. 14/776,512.7, dated Jan. 3, 2017, 9 pages.
Second Office Action for Chinese Application No. 201480010581.5, dated Apr. 17, 2017, 6 pages (1 page English translation).
Preliminary Rejection for Korean Application No. 10-2015-7023211, dated May 18, 2017, 11 pages (1 page English translation).

* cited by examiner

VEHICULAR OCCUPANCY ASSESSMENT

BACKGROUND

Conventional technologies permit identification a driver of a car in operation, which in turn permits straightforward transfer of information between the car and a mobile device of the driver. Availability of the driver information can permit some customization of content and/or services and/or car systems (e.g., cockpit or cabin). In such technologies, identification of the driver of the car typically is based on the implicit knowledge related to the pre-configured location of a driver within a car (e.g., front row, left or right side) and on the fact that typically a single driver generally operates the car at a time. In addition, such transfer of information is largely simplified by a one-to-one communication with the mobile device of the driver, and typically fails to account for presence of other devices associated with other occupants within the car or in proximity thereto.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1:
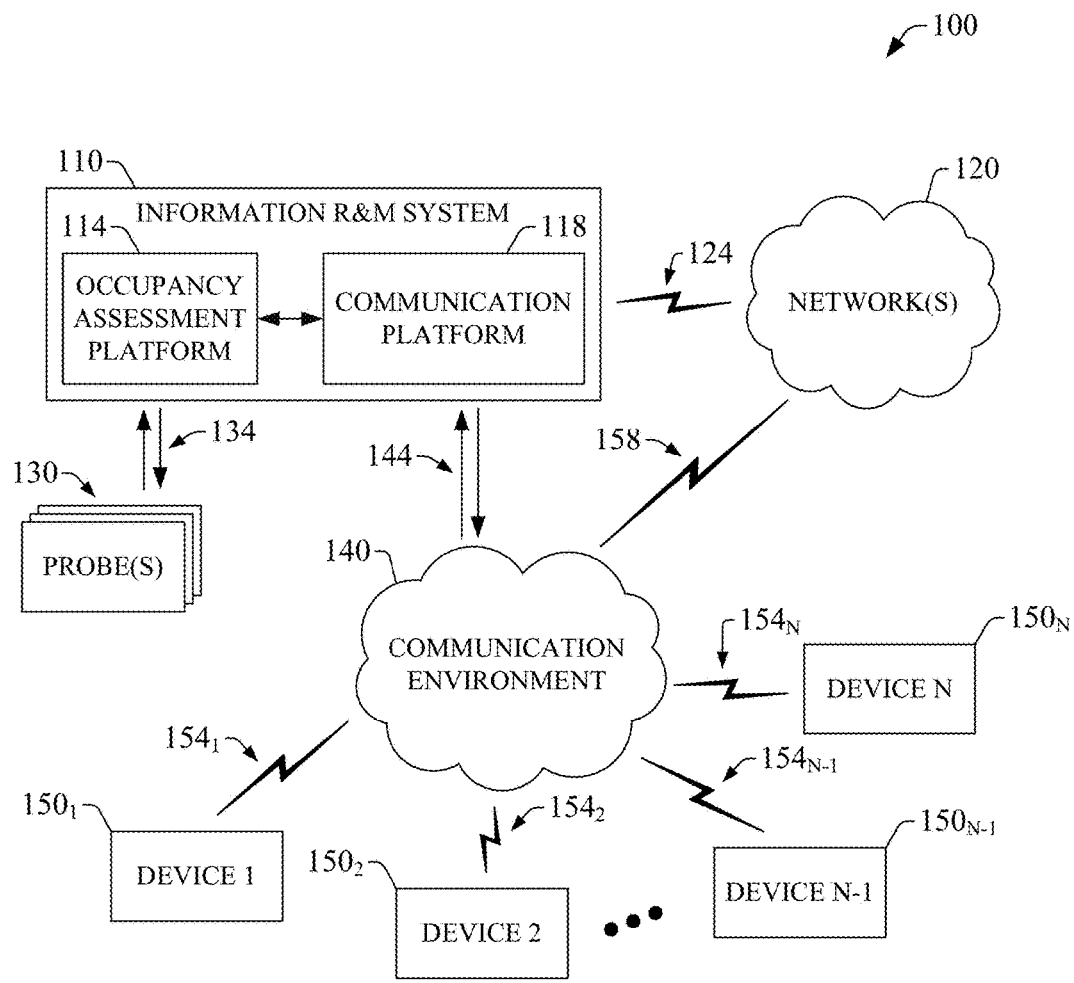
FIGS. 1-2B present example operational environments in accordance with one or more aspects of the disclosure.

The disclosure recognizes and addresses, in one aspect, the issue of vehicle occupancy—e.g., position within the vehicle and identity of the vehicle's occupant(s)—and related rich functionalities and interaction associated with the occupant(s) of a vehicle. The disclosure further recognizes that the increasing adoption of technology within a vehicle environment can produce novel experiences that can be developed or envisioned in connection with integrated services (e.g., safety services) and content, such as informational content, entertainment content, instructive or otherwise educational content either for the passengers or the driver, and communication with remote or local individuals. Such integrated services and content can be collectively referred to as infotainment. The disclosure regards a vehicle as a shared space in which various activities or experiences can be created for the vehicle occupant(s). These activities can include social or collaborative components comprising, for example, collaborative games, educational activities, activities that integrate educational features and entertainment (referred to as edutainment), augmented reality, combinations of the foregoing, or the like. Such activities or experiences can leverage rich sensing capabilities in a vehicle and/or mobile devices (such as smartphones and tablets) in order to leverage or exploit the occupants' needs and preferences. For instance, novel services for safety, entertainment, education, and educational entertainment (also referred to as edutainment) need specific information of occupants and their position.

At least to permit more seamless and/or enjoyable experiences for a vehicle's occupant(s), as described herein, in one aspect, the disclosure provides an occupancy assessment that includes determination of position of one or more occupants within the vehicle and identity of the one or more occupants. The occupancy assessment leverages conventional, simple presence assessment mechanisms, such as pressure sensors in the seats of the vehicle that can provide anonymous presence information. In addition, the occupancy assessment can correlate the anonymous presence information with information collected from mobile devices present in the vehicle and/or sensor(s) or probe(s) within the vehicle. The occupancy assessment is universal within the vehicle in that position and identity of each occupant of the vehicle can be established, which can permit rich integration among the occupants' devices and information consumed or generated therefrom. Such integration does not rely on human intervention beyond that of confirmation of certain information, and may be superior to certain conventional explicit profile selection mechanisms that rely on utilization of buttons in the vehicle front-row, middle-row (when available), and/or rear-row seats. The disclosed assessment can include automated discovery of occupant's position within a vehicle and identity of the occupant. In another aspect, for collaborative and novel experiences in a vehicle, for example, the disclosure permits generation of an estimate of the number of occupants in the vehicle, and their identity and position within the vehicle. The disclosure can utilize or otherwise leverage a computing platform for generation and management of content (e.g., information indicative of state of the vehicle, navigation information, entertainment content, any combination thereof, or the like) that can be deployed within the vehicle; probe(s) or sensor(s) within the vehicle; and sensing and/or computational capabilities present in mobile devices within or in proximity to the vehicle, in order to perform an occupancy assessment that at least can establish or otherwise provide position and identity of one or more occupants of the vehicle. Information generated via the occupancy assessment can permit leveraging at least knowledge of a user profile, a personal preference, and the like in order to extend or otherwise enrich an occupant's activities within the vehicle. It should be recognized the while the disclosed occupancy assessment is illustrated with reference to a vehicle, the disclosed occupancy assessment can be implemented for substantially any enclosure having the computing platform for generation and management of contents and being configured to contain one or more mobile devices.

Referring to the drawings, FIG. 1 presents an example operational environment 100 in accordance with one or more aspects of the disclosure. As illustrated, the operational environment 100 includes information rendering and management system 110 (e.g., an in-vehicle infotainment (IVI) system) that can be functionally coupled (e.g., communicatively coupled) to one or more networks 120 via data and signaling pipe(s) 124, and to one or more probes 130 via one or more links 134. In the present specification and annexed drawings, the information rendering and management (IRM) system 110 also is referred to as information R&M system 110. The link(s) 134 can include a downstream link (DL) and/or an upstream link (UL), and can be embodied in wired link(s), wireless link(s) (including terrestrial air interfaces and/or deep-space link(s)), or a combination thereof. The probe(s) 130 can include one or more sensors and/or one or more cameras. The probe(s) 130 can be deployed (e.g., installed; configured; accepted; installed and accepted; configured and accepted; installed, configured, and accepted; or the like) within the enclosure (e.g., a cockpit or vehicle cabin) that contains the IRM system 110. In certain embodiments, at least one probe of the probe(s) 130 can collect or can be configured to collect information (e.g., data, metadata, and/or signaling) indicative of operational features of a vehicle (e.g., vehicle 204). For example, the at least one probe (e.g., one probe, two probes, more than two probes, or the like) can detect or can be configured to detect the motion of the vehicle. In such example, the at least one probe can be embodied in or can comprise an accelerometer and/or a gyroscope. The accelerometer can detect or otherwise collect and/or supply information indicative of changes in velocity, such as increments in velocity or decrements in velocity (also referred to as braking or slowing of the vehicle). In one embodiment, the accelerometer can be a three-axis accelerometer. In addition, the gyroscope can detect or otherwise collect and/or supply information indicative of steering of the vehicle. In certain embodiments, in addition to the accelerometer and/or gyroscope, the probe(s) 130 can include a gyroscopic compass (or gyrocompass) or other type of compass, which can measure or otherwise collect information indicative of bearing (or orientation) of an enclosure containing the IRM system 110.

In addition or in the alternative, at least another probe of the probe(s) 130 can collect or can be configured to collect information indicative of behavior of an occupant of the enclosure that contains the IRM system 110, such as an operator or a passenger of a vehicle. Such information can be referred to as behavioral information and can comprise, for example, imaging information indicative of movement or positioning of the occupant of the vehicle. In such example, one or more cameras (e.g., operator-facing cameras, which can be installed in the rear-view mirror dashboard area of a vehicle having the IRM system 110) can be included in the probe(s) 130, and can generate the imaging information.

In certain embodiments, the IRM system 110 can be functionally coupled to control components (not depicted), lighting fixtures (not depicted), and/or rendering component(s) (not depicted). The IRM system 110 also can be functionally coupled to a group of N devices $150_1$-$150_N$ (with N a natural number greater or equal to unity) via a communication environment 140 (e.g., an ad hoc communication network) within and/or in proximity to an enclosure that contains the IRM system 110. Accordingly, in one aspect, the communication environment 140 can form a locally confined communication network, such as a local area network (LAN), a personal area network (PAN), a combination thereof, or the like. Communication environment 140 can comprise the air interface, which can transport information (e.g., data, metadata, and/or signaling) according to one or more modulation and encoding techniques associated with one or more radio technologies. The one or more links 144 represent the functional coupling between the IRM system 110 and the communication environment 140. The link(s) 144 can include a downstream link (DL) and/or an upstream link (UL), and can be embodied in wired link(s), wireless link(s), or a combination thereof. Similarly, wireless links $154_1$-$154_N$ functionally couple respective devices $150_1$, $150_2$, . . . , $150_{N-1}$, and $150_N$ to the communication environment 140. Such links also permit functional coupling between two or more of the devices $150_1$-$150_N$. It should be appreciated that, in certain embodiments, one or more of the wireless links $154_1$-$154_N$ can be replaced with a wired link. In other embodiments, one or more wired links can be added to the set of wireless links $154_1$-$154_N$, wherein such wired link(s) also can permit communication among two or more of the devices $150_1$-$150_N$ and/or the IRM system 110. In addition, the IRM system 110 also can communicate with one or more of the devices $150_1$-$150_N$ via at least one network of the network(s) 120. Link(s) 158 can permit functional coupling between the communication environment 140 and at least one of the network(s) 120. The network(s) 120 can comprise wireless networks and/or wireline networks, having different deployment scope, e.g., personal area network(s), home area network(s), local area network(s), wide area network(s), deep-space network(s) (such as satellite networks), a combination thereof, or the like. It should be appreciated that the network(s) 120 can be deployed at specific location(s) and can have a coverage scope that does not move with the enclosure that contains the IRM system 110, whereas the scope of coverage of the communication environment 140 accompanies such enclosure.

Figure 2A:
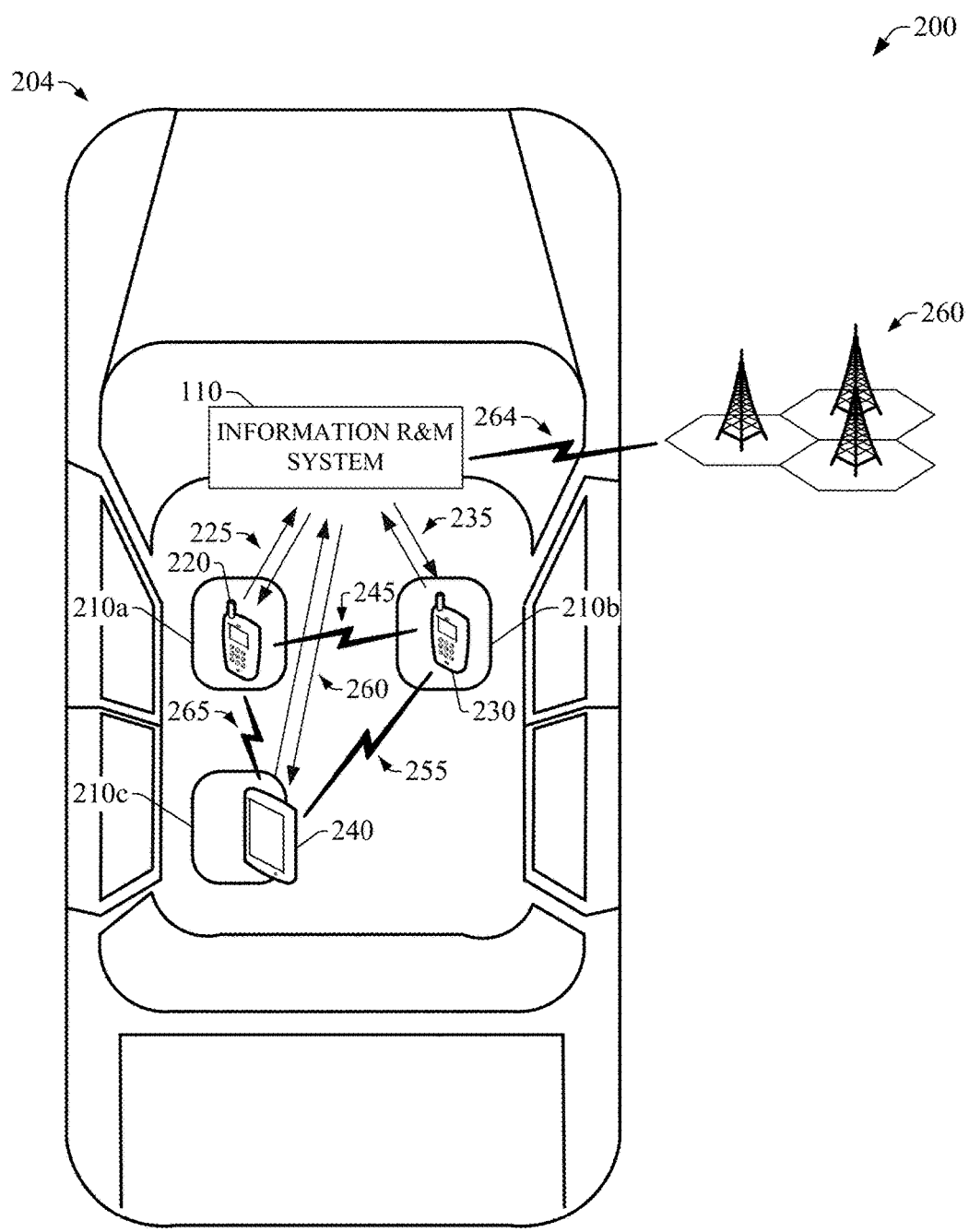

A communication platform 118 can permit the functional coupling of the IRM system 110 with one or more of the network(s) 120, the probe(s) 130, and the devices $150_1$-$150_N$. In one aspect, the communication platform 118 can embody or can comprise an access point (or base station) for networked communication. As illustrated, the IRM system 110 also can comprise an occupancy assessment platform 114 that can perform an occupancy assessment of the enclosure that contains the IRM system 110 and the devices $150_1$-$150_N$. As part of such assessment, in one aspect, the occupancy assessment platform 114 can determine a number of occupants of the enclosure and their respective identities. In one embodiment, as illustrated in example embodiment 200 in FIG. 2A, such enclosure can be embodied in or can comprise a vehicle 204. Accordingly, the vehicle 204 can have the IRM system 110. In addition, the vehicle 204 can include devices 220, 230, and 240, which can be positioned at respective positions (e.g., seats) 210a, 210b, and 210c within the vehicle 204. In certain scenarios, one or more of the positions 210a, 210b, or 210c can have specific assignments based at least on a preference of an owner or lessee, or an occupant of the vehicle 204. For instance, position 210a can correspond to the owner or lessee who can operate, in general, the vehicle 204. Similarly, position 210c can be assigned to a passenger having specific physical characteristics, such as a child or a pet. Accordingly, in one aspect, device 220 is likely to be associated with the owner or lessee of the vehicle, whereas device 240 is likely to be associated with the child (e.g., the device 240 can be a tablet computer or a portable game console) or the pet (e.g., an radiofrequency identification (RFID) microchip).

As illustrated, such devices can communicate with each other via links 245, 255, and 265, and with the IRM system 110 via links 225, 235, and 260. It should be appreciated that, in one aspect, the links that permit communication among the devices can be different from the links that permit communication of a device with the IRM system 110. It should further be appreciated that, in certain embodiments, two or more of the devices 220, 230, and 240 may not communicate directly via one or more of the links 245, 255, or 265. As described herein, the IRM system 110 can be functionally coupled (e.g., communicatively coupled) with an external network 260 via one or more links 264, which can include a DL and/or an UL, and can be embodied in wired link(s), wireless link(s) (including terrestrial and/or deep-space link(s)), a combination of the foregoing, or the like.

Figure 2B:
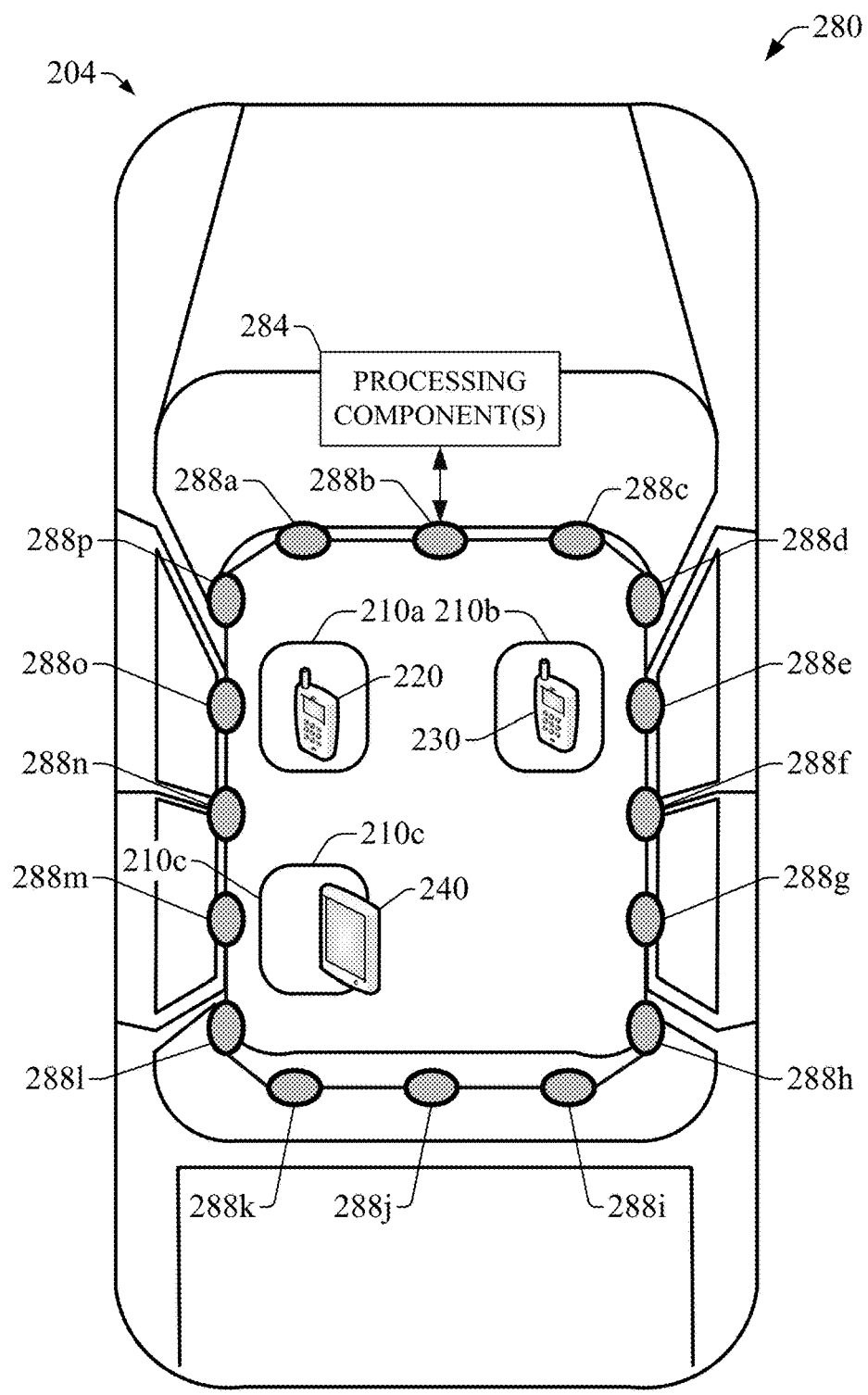

In certain embodiments, e.g., embodiment 280 illustrated in FIG. 2B, the communication platform 118 can include a distributed antenna system (DAS) comprising several antennas 288a-288p distributed throughout the vehicle. The processing component(s) 284 represent various functional components of the IRM system 110, including certain functional elements of the communication platform 118 and the occupancy assessment platform 114. It should be appreciated that while the illustrated DAS comprises sixteen antennas, the disclosure is not so limited and a greater or lesser number M of antennas can be contemplated. Here, M is a natural number greater than unity. It should further be appreciated that, in one aspect, a larger number of antennas can provide improved accuracy in determining a location estimate of a device in wireless communication at the expense of increased architectural complexity of the communication platform 118. In one aspect, upon or after registration with the IRM system 110, a mobile device, such as device 220, 230, or 240, can communicate with the IRM system 110 via at least one or more of the antennas 288a-288p.

At least to perform an occupancy assessment of an enclosure, such as vehicle 204, the occupancy assessment platform 114 can acquire or otherwise receive information (e.g., data, metadata, and/or signaling) from the communication platform 118. In one embodiment, e.g., embodiment 300 illustrated in FIG. 3, at least a portion of such information can be acquired from at least one of the probe(s) 130 and/or at least one of the one or more devices 304. In one aspect, the device(s) 304 can include or can embody the devices $150_1$-$150_N$. The communication platform 118 can be functionally coupled to the device(s) 304 via a data and signaling pipe 308. In one aspect, the communication platform 118 can include a radio unit 314 that can exchange information wirelessly with at least one of the device(s) 304, and an exchange component 318 that can exchange information with at least one of the probe(s) 130. It should be appreciated that in certain embodiments, one or more probes of the probe(s) 130 can communicate wirelessly with the communication platform 118 via the radio unit 314. In one embodiment, the radio unit 314 can include one or more antennas in addition to at least one component configured or otherwise suitable to process wireless signal. In a scenario in which the radio unit 314 contains several antennas, these antennas can be distributed throughout the vehicle (see, e.g., FIG. 2B) having the IRM system 110, or can be substantially localized in a specific area of such vehicle.

Figure 3:
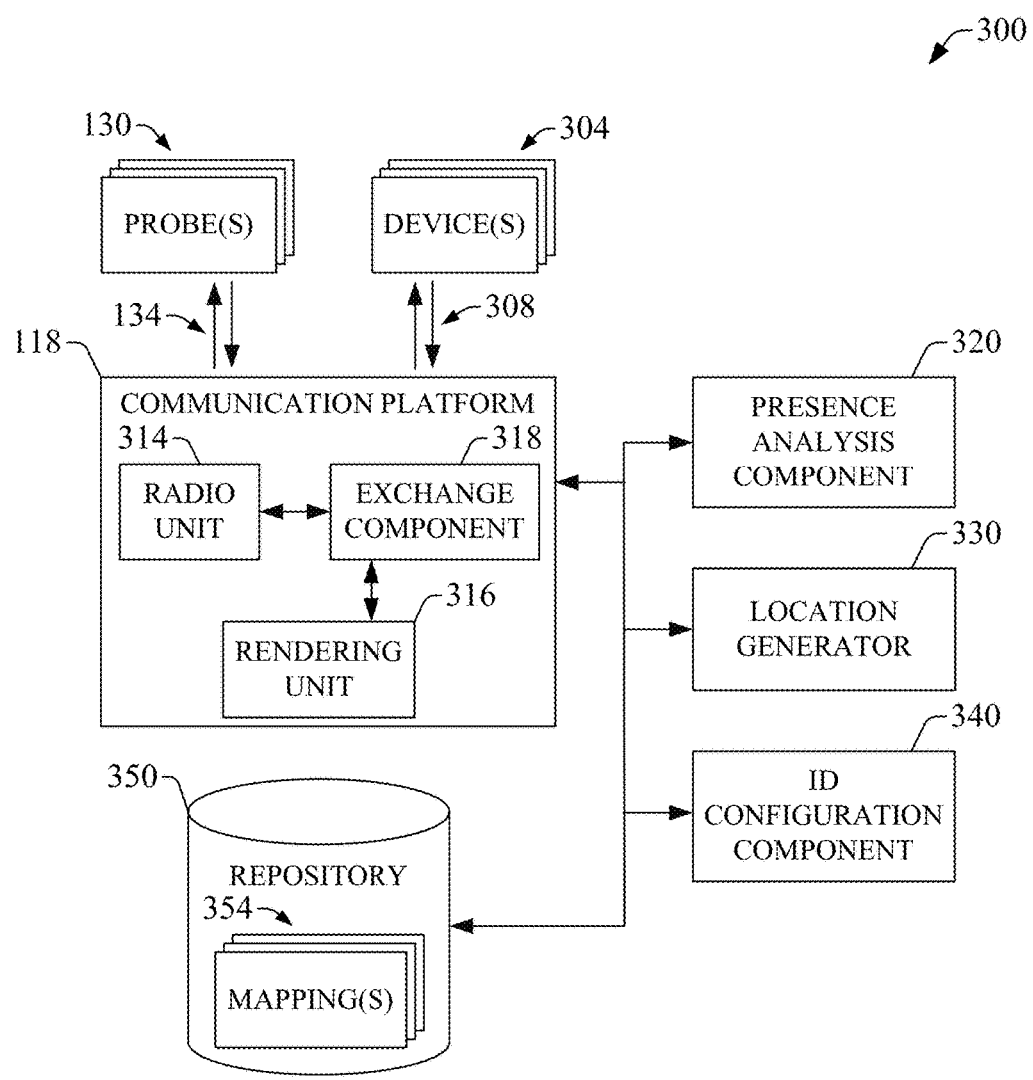
FIGS. 3-4 present example systems in accordance with one or more aspects of the disclosure.

FIG. 3 illustrates an embodiment 300 in which a presence analysis component 320, a location generator component 330 (also referred to as location generator 330), an ID configuration component 340, and a repository 350 can embody or can be contained in the occupancy assessment platform 114. The presence analysis component 320 that can access specific information originated at one or more of the probe(s) 130 and can determine, based at least on a portion of such information, a number of occupants within the enclosure (e.g., vehicle 204) that contains the IRM system 110. The number of occupants generally is determined without determining identification information. Accordingly, in one aspect, such determination is referred to as an anonymous determination of the number of occupants. For example, the presence analysis component 320 can analyze pressure sensor information received from one or more seat pressure sensors included in the probe(s) 130, and based at least on an outcome of the analysis, the presence analysis component 320 can establish a number of seats that are occupied in the enclosure. In addition or in the alternative, the presence analysis component 320 can analyze imaging data, which can be received from one or more cameras included in the probe(s) 130, and based at least on the analysis, can determine a number of occupants of the vehicle 204. In one aspect, the analysis can include object recognition analysis (such as face recognition analysis), in which the presence analysis component 320 can implement a computer-vision technique to recognize occupants of the enclosure and generate a number of occupants. It should be appreciated that the presence analysis component 320 can refine a number of occupants generated via a first sensor information (e.g., pressure sensor information) through a comparison to a number of occupants generated via a second sensor information.

In the embodiment 300, the occupancy assessment platform 114 also can comprise a location generator 330 that can determine a group of occupant location estimates. The location generator 330 can utilize or otherwise leverage information (data, metadata, and/or signaling) acquired from at least one probe of the one or more probes 130 to determine location of a group of occupants as established via the presence analysis component 320. In one aspect, the location generator 330 can utilize pressure sensor information to populate a seat map of the enclosure and, in response, generate a location estimate for each occupant associated with an occupied seat. Accordingly, in one aspect, the location generator 330 can generate a group of one or more location estimates respectively associated with a group of one or more occupants. A location estimate can be embodied in or can comprise an information object (e.g., a data structure) indicative of position within the enclosure that contains the IRM system 110. It should be appreciated that, in one aspect, each of the location estimates can be identity agnostic, or anonymous.

In addition, the location generator 330 can utilize or otherwise leverage information acquired from at least one device of the device(s) 304 in order to generate, inter alia, a location estimate for a device of the at least one device. The at least one device is registered to communicate with the IRM system 110. The location estimate can be referred to as device location estimate. In certain scenarios, at least a portion of such information can include location information associated with the at least one device or other device(s) and an identifier of the at least one device. The location generator 330 can assign the location information to a location estimate of the at least one device and/or can assign the identifier to a record of the at least one device, wherein the record can be retained within the IRM system 110. In other scenarios, the location generator 330 can exchange (e.g., transmit and/or receive) pilot information (e.g., signaling) wirelessly with at least one device of the device(s) 304 via the radio unit 314 contained in the communication platform 118. Based at least in part on at least a portion of the pilot information, the location generator 330 can generate a location estimate for the at least one device. In one implementation, for example, the location generator 330 can generate timing information associated with transmission of a probe pilot signal (which can be included in the pilot information) and reception of a response pilot signal (which also can be included in the pilot information). Based at least in part on a specific model for propagation of wireless signal (e.g., radiofrequency (RF) signal, microwave signal, infrared signal, visible electromagnetic signal, or the like) within the enclosure (e.g., the vehicle 204) that contains the IRM system 110, the location generator 330 can utilize the timing information to generate the device location estimate of the at least one device.

In another implementation more particular, yet not exclusive, to embodiments in which communication platform 118 comprises a DAS, the location generator 330 can avoid reliance on timing information to generate a device location estimate. Rather, in one aspect, the location generator 330 can detect or otherwise determine intensity of a wireless signal (e.g., intensity of a pilot signal) received at each of a plurality of antennas (e.g., antennas 288a-288p) in the DAS or a portion of the plurality of antennas in the DAS. For instance, the location generator 330 can detect or otherwise determine a radio signal strength indication (RSSI) at each antenna in the DAS and can generate an estimate of a likely position of a device in communication with the IRM system 110. To at least such end, in one aspect, the location generator 330 can extract (e.g., decode) a device identifier conveyed in a wireless pilot signal that is received at the radio unit 314, and can determine the magnitude of the RSSI at each antenna in the plurality of antennas in the DAS. The device identifier can be associated with the plurality of RSSIs determined by the radio unit 314, and the plurality of RSSIs can be ordered according to increasing or decreasing magnitude. Based at least on such ordering, the location generator 330 can select one or more RSSI magnitudes according to certain criteria (e.g., largest magnitude, largest magnitude and second largest magnitude, R largest magnitudes (with R a natural number greater than or equal to unity), or the like) and can assign a position in proximity with the antenna(s) having the selected magnitudes to the device location estimate. For instance, in embodiment 280, antenna 288o can have the largest RSSI of the several RSSIs detected or otherwise determined for the plurality of antennas 288a-288p, and thus the location generator 330 can assign position 210a to the device location estimate for the device 220. Similarly, antenna 288e can have the largest RSSI and thus the location generator 330 can assign position 210b to the device location estimate for the device 230.

It should be appreciated that, in one aspect, a DAS and availability of communication between the DAS and a device within the enclosure that is coupled to the DAS can permit generation of a ground-truth estimate, or absolute location estimate for the device. For instance, the device can collect, via a radio unit, for example, timing information (e.g., timing messages) originated at two or more of a plurality of antennas that embody or are included in the DAS. Based at least in part on at least a portion of the timing information, the device can determine—e.g., compute via trilateration and/or triangulation—the ground-truth estimate.

In yet another implementation, in order to generate a device location estimate, an IRM system 110 can leverage occupancy information and communication with a device within the enclosure (e.g., cockpit or vehicle cabin) that contains or is functionally coupled to the IRM system 110.

As described herein, the occupancy information can be generated by the presence analysis component 320 and can include information indicative of an instant at which a specific position (e.g., position 210c) within the enclosure (e.g., vehicle 204) is occupied. In one aspect, pressure sensors located in respective seats (or, more generally, positions) of the enclosure can generate information (e.g., a signal) indicative of a seat being occupied. In addition, the location generator 330 can acquire (e.g., receive, collect, or otherwise access) information indicative of motion, such as linear acceleration or angular acceleration, from the device within the enclosure. Such information can be time dependent and can convey movement of the device relative to the enclosure. In certain scenarios, such movement is due to the device entering into the enclosure (e.g., the vehicle 204) and can be characterized or otherwise represented by finite values of acceleration (either positive or negative values) that become smaller as time progresses. Small or negligible values of acceleration in conjunction with small or negligible values of velocity (such as linear velocity) can convey that the device is at rest. Accordingly, in one scenario, occupancy information can be correlated with motion information (such as linear acceleration, angular acceleration, linear velocity, angular velocity, a combination thereof, or the like) in order to ascertain, with a certain level of accuracy or likelihood, that the device occupies a specific position within the enclosure. To at least such end, the location generator 330 can correlate the onset or substantial onset of signal indicative of a position within the enclosure being occupied and the reduction of acceleration and velocity of a device in order to establish a time at which the device is substantially at rest. In a scenario in which the onset or substantial onset of such signal occurs at substantially an instant at which the device reaches a rest state, or is substantially static, the location of the device can be assigned to be the position that is occupied.

As described, the location generator 330 can produce at least a group of occupant location estimates and a group of device location estimates. The former group can provide an occupancy structure of the enclosure that is identity agnostic, whereas the latter group can provide a distribution structure of a group of devices (e.g., device(s) 304) within the enclosure. In view that each device of at least a portion of the group of devices can be respectively associated with an end-user, the distribution structure of the group of devices can provide information indicative or otherwise representative of a distribution of estimated identities within the enclosure.

In embodiment 300, the identity (ID) configuration component 340 can access the group of occupant location estimates and the group of device location estimates, and can associate an occupant location estimate with a device location estimate. Based on specific associations, the ID configuration component 340 can generate a mapping of occupant-device location estimates. Mappings of occupant-device location estimates can be retained in one or more memory elements referred to as mapping(s) 354 within repository 350. Such mappings can be time-dependent, with the mappings being updated in response to rearrangement of at least one device of the device(s) 304. Such rearrangement can result in updated device locations of the at least one device, with the ensuing updated device distribution structure which can be reflected in an updated mapping. In certain scenarios, a rearrangement (or reaccommodation) of at least one of the device(s) 304 can yield a change in the occupancy structure of the enclosure. In particular, yet not exclusively, in a scenario in which a device enters into a vehicle or exits the vehicle, an occupant-device location mapping can change in response to the change in the occupancy structure within the vehicle that may be caused by the device entering into or exiting from the vehicle. Yet, it should be appreciated that in other scenarios, a rearrangement of device(s) within a vehicle may not yield a change in the occupancy structure of the vehicle. For instance, in a scenario in which a device moves within the vehicle without a change in the occupancy structure, an occupant-device location mapping can remain unchanged. As an illustration of such scenario, an occupant of the vehicle can provide the device to another occupant of the vehicle (e.g., a child in the back seat of the vehicle) without the occupant moving to the location of the other occupant (e.g., the back seat). In certain embodiments, the location generator 330 can detect or otherwise determine a change in location of a device within an enclosure (e.g., a vehicle) that includes the IRM system 110 and, in response, can instruct or otherwise direct (e.g., transmit a command or instruction to) at least one of the probe(s) 130 (such as a camera) to collect imaging information of the interior of the enclosure (e.g., a vehicle's cabin) in order to ascertain that an occupancy structure of the vehicle has changed or to ascertain that the occupancy structure of the vehicle remains unchanged. To at least such end, in one aspect, the presence analysis component 320 can determine a current occupancy structure in response to detecting the movement of the device, and can compare the updated occupancy structure with a previous occupancy structure to determine if such structures are different.

In certain embodiments, the ID configuration component 340 can associate one occupant location estimate to one device location estimate, thus generating a one-to-one occupant-device mapping. As an illustration, in connection with FIG. 2A, a location estimate indicative of the position 210a can be associated with a device location estimate for the device 220, a location estimate indicative of the position 210b can be associated with a device location estimate of the device 230, and a location estimate indicative of the position 210c can be associated with a device location estimate of the device 240. In another scenario, the ID configuration component 340 can associate one occupant location estimate to two or more device location estimates, thus generating a one-to-many occupant-device mapping. In such scenario, for example, one occupant of enclosure can have two or more devices for which a device location estimate has been generated.

Based at least in part on an occupant-device mapping, the ID configuration component 340 can assign an identity of an end-user associated with a device (e.g., one of the device(s) 304) to a position within the enclosure that contains the IRM system 110. The ID configuration component 340 can access or otherwise receive one or more identities associated with one or more devices via a mapping that associates a device identifier with a specific end-user. The device identifier, which can be unique, can include an international mobile subscriber identity (IMSI); temporary IMSI (TIMSI); an international mobile equipment identifier (IMEI); a mobile directory number (MDN); a mobile identification number (MIN); a Telecommunications Industry Association (TIA) electronic serial number (ESN); a multi-bit identification number like the mobile equipment indentifier (MEID); a mobile subscriber ISDN (Integrated Services Digital Network) number (MSISDN); an IP (internet protocol) multimedia private identity (IMPI); or an IP multimedia public identity (IMPU). In one aspect, the mapping can be retained in a memory element of the mapping(s) 354. The mapping can be generated upon or after a previously unmapped device (one of the device(s) 304) enters the enclosure that contains the IRM system 110. For instance, the ID configuration component 340 can detect such a device has entered the enclosure and can prompt an end-user associated with the device to provide identification information. To at least such end, the ID configuration component 340 can direct the communication platform 118, via the exchange component 318, for example, to render a request (or indicia indicative thereof) for identification. Information indicative of identification that is collected or otherwise accessed by the communication platform 118 in response to the request can be transmitted or otherwise supplied to the ID configuration component 340 and/or retained in a mapping in mapping(s) 354. In another aspect, the ID configuration component 340 can access such a device-ID—end-user mapping from a network of the network(s) 120 via the communication platform 118.

One or more specific devices of the device(s) 304 can exit from the enclosure (e.g., the vehicle 204) that contains the IRM system 110 at various times and can re-enter the enclosure at other times. Each instance in which a device of the device(s) 304 occupies (e.g., by entering into) the enclosure can be referred to as an occupancy instance. In certain scenarios, at least one device of the one or more specific devices can be positioned at substantially the same location of a prior occupancy instance. For example, for a car, children typically have substantially assigned seats within the car. Thus, in one aspect, a device (device 240) associated with a child who has a specific seating position within the car can occupy substantially the same position (e.g., 210c) within the car. It should be recognized that while such scenarios are illustrated with a child as an example of an occupant, other occupants (e.g., a spouse) with typical seat assignments also are contemplated. Accordingly, in one aspect, over various historical occupancy instances, the one or more specific devices can be positioned at respective locations that remain substantially unchanged. Similarly, certain occupancy structures can repeat themselves throughout historical occupancy instances.

Figure 4:
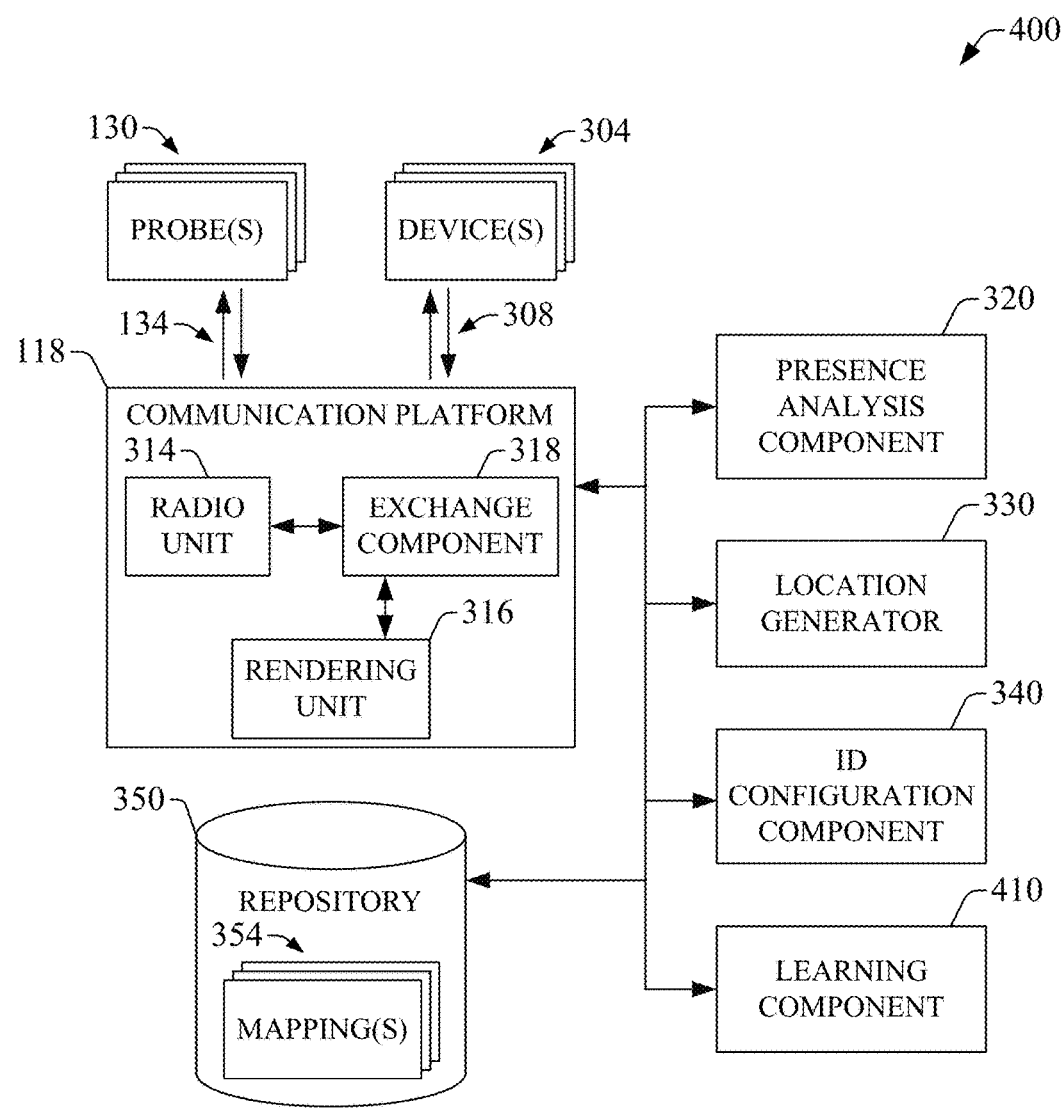

In embodiment 400 illustrated in FIG. 4, a learning component 410 can generate specific occupancy structure(s) and/or device distribution structure(s) autonomously from information (historical and/or contemporaneous) indicative of occupancy instances for an enclosure that includes the IRM system 110. The occupancy structures that are generated can be identity agnostic or can include information that identifies an end-user at a specific position within such an enclosure. In one aspect, autonomous generation of a device distribution structure and/or an occupancy structure does not rely on or otherwise does not leverage functionality of the location generator 330, for example. In certain implementations, the learning component 410 can process at least a portion of the information indicative of occupancy instances according to artificial intelligence techniques in order to at least infer a device distribution structure and/or an occupancy structure for a specific enclosure at a specific instant.

In certain embodiments, the learning component 410 can fuse two or more of the described techniques to generate a device location estimate. To at least such end, in one aspect, the learning component 410 can implement a machine learning technique, or an inference technique, to collect or otherwise access various sets of device location estimates generated according to respective techniques to determine a device location estimate, and based on the resulting location information can infer the likely location of one or more devices. It should be appreciated that each technique to determine a device location estimate can produce information indicative of a distribution of devices having a specific likelihood of a device being at a specific position within an enclosure that contains or is functionally coupled to an IRM system 110—e.g., each technique can map a probability of device presence for each position (e.g., a seat) in the enclosure. In order to generate a device distribution for a plurality of devices within the enclosure (e.g., a vehicle, such as vehicle 204), a fused technique that can be implemented by the learning component 410 can utilize or otherwise leverage, for example, averaging, taking a maximum, a product, voting, or naïve Bayes networks in order to generate a probability of a device being located at certain position within the enclosure. Such probability represents or is otherwise indicative of positioning metric of the device within the enclosure.

In embodiments in which sensing technologies and/or determination of occupancy structure for a plurality of devices within an enclosure may not available and/or fidelity of a specific occupancy structure is poor or otherwise unreliable—e.g., confirmation from end-users associated with the plurality of devices may be necessary because of uncertainty—a rendering unit 316 in the communication platform 118 (e.g., a central display in an IRM system) can render (e.g., display) views of the occupants of the enclosure (e.g., a vehicle) within the enclosure and their estimated positions. Such views can be obtained by a camera within the enclosure, pointing at each of the available positions (e.g., seats). In addition, the exchange component 318 can prompt each occupant or at least a group of the occupants to confirm their position and/or identity with the enclosure. To at least such end, the exchange component 318 can generate information indicative or otherwise representative of a confirmation request or query, and can direct the rendering unit 316 to convey such information. In one aspect, an end-user can provide confirmation via information indicative of their position and identity by clicking, tapping, or otherwise gesturing to select the occupant's camera image in a rendering, at the rendering unit 316, of the enclosure's interior (e.g., vehicle cabin or cockpit). In addition, the end-user can provide an occupant's identity (e.g., a name) and explicitly identify the occupant's position within the enclosure. For example, the occupant can drag-and-drop the occupant's identity and/or an occupant's profile to a "grid" (e.g., a predetermined arrangement or configuration) of seats and images representative or otherwise indicative of the estimated occupancy structure. The learning component 410 can infer specific occupancy structures based at least on contemporaneous and/or historical information indicative or otherwise representative of the confirmation of position and/or identity within the enclosure.

Figure 5:
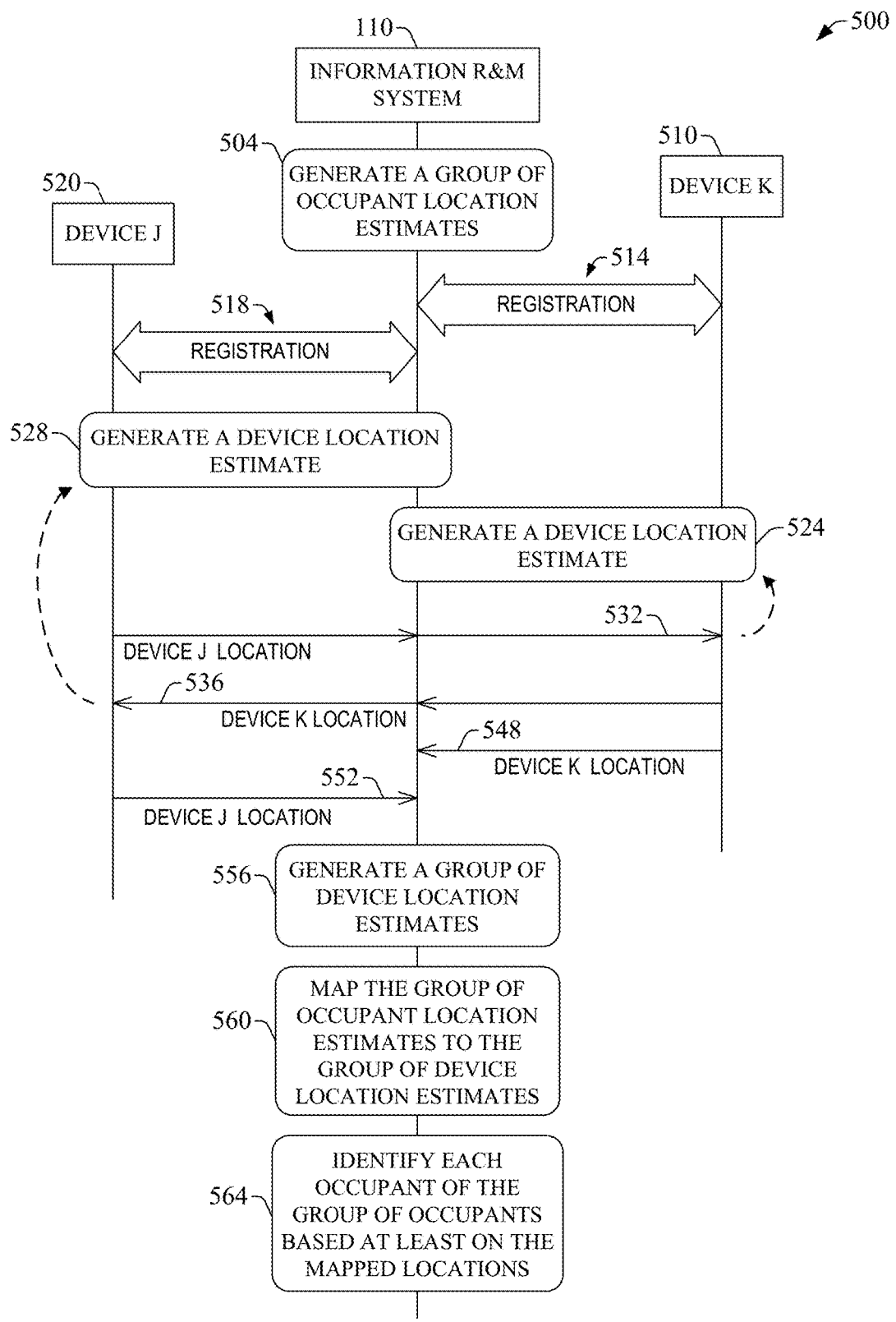
FIG. 5 presents an example call flow in accordance with one or more aspects of the disclosure.

FIG. 5 illustrates an example call flow 500 for occupancy assessment in accordance with one or more aspects of the disclosure. As illustrated, various types or kinds of information can be exchanged between the IRM system 110 and two devices representative of devices $150_1$-$150_N$ that can communicate with the IRM system 110. Such information permits, in one aspect, performance of an occupancy assessment as described herein. At block 504, the IRM system 110 can generate a group of occupant location estimates. As described herein, the IRM system 110 can utilize or otherwise leverage several probes (e.g., probe(s) 130) that provide information indicative or otherwise representative of occupancy of the enclosure that contains the IRM system 110. For example, one or more pressure sensors integrated into or functionally coupled to seat(s) in the enclosure (e.g., a vehicle) can provide pressure data and/or signaling indicative of occupation of the seat(s) that are associated with the one or more pressure sensors. The group of occupant location estimates is indicative or otherwise representative of an occupancy structure of such enclosure. As illustrated, the device K 510 and device J 520 can register with the IRM system 110 via, for example, exchange of registration information 514 and registration information 518, respectively. The device K 510 and the device J 520 can utilize or otherwise leverage such registration (e.g., upon registration or after registration) and communication with the IRM system 110 to generated respective location estimates, In one aspect, the device K 510 can generate a device location estimate at block 524. The device location estimate can be a location estimate for the device K 510 or a location estimate for another device, which can be a relative location estimate. Similarly, a device J 520 can generate a device location estimate at block 528, wherein the device location estimate can be a location estimate for the device J 520 or a location estimate for another device, which can be a relative location estimate. As illustrated, the devices 510 and 520 can exchange information indicative of their respective locations: The device J 520 transmits information 532 indicative of device J location to the device K 510, and the device K 510 can transmit information 536 indicative of device K location to the device J 520. As illustrated, the device J 520 and the device K 510 can exchange location information via the IRM system 110. It should be appreciated that in certain embodiments, such devices can exchange the information directly, within a point-to-point modality of communication. It should further be appreciated that, in certain embodiments, in addition to device location information, devices 510 and 520 also can exchange (a) information indicative of their respective motion and/or or motion of other devices, and/or (b) information generated by the IRM system 110, such as information generated by one or more of the probe(s) 130 (e.g., data generated by pressure sensor(s)) or timing information related to generation of occupant location estimates as described herein. Such exchange of information can permit the devices 510 and 520 to access or otherwise generate information indicative of positioning or a distribution of at least one device within or in proximity to an enclosure (such as the vehicle 204) that contains the IRM system 110. In certain embodiments, a location estimation process can be distributed across a plurality of devices comprising device K 510 and device J 520, wherein each device of the plurality of devices receives a location estimate of the other devices in the plurality and updates a current group of location estimates for each device in the plurality of devices. As illustrated, in such process, the device K 510 can receive the information 532 indicative of device J location in addition to information indicative of location of other devices in the plurality of devices. Based at least on a portion of such information, the device K 510 can generate a location estimate of the device K 510, and can transmit information 536 indicative of the device K 510 location to the device J 520 and other devices in the plurality of devices. The device J 520 can utilize such information and information indicative of location of other devices in the plurality of devices and can update (represented with a dashed arrow) a previously computed location estimate for the device J 520. Information indicative of an updated location estimate for the device J 520 can be transmitted to the device K 510 and other devices in the plurality of devices. Based at least on the updated information for at least the device J 520, the device K 510 can update (represented with a dashed arrow) a location estimate for the device K 510. Such iterative procedure can be continued until a location estimate for each device in the plurality of devices converges to a specific value or the improvement in location determination is minimal (e.g., all locations converge to specific values).

Various iterative methods can be utilized, such as Expectation/Maximization algorithms or iterative K-means algorithm. In certain embodiments, the information that is input or supplied to each device can be based on one or more of (1) timing information of the temporal variation or time difference ($\delta t = t_0 - t_{onset}$) between a time ($t_0$) an accelerometer of a device (e.g., device 220) is at rest and the time ($t_{onset}$) of the pressure sensor generating (also onset, informally referred to as firing or triggering) a "seat" event, or (2) RSSI signal(s) between the IRM system 110 or the antennas thereof (e.g., some or all of 288a-288p) and each device. For example, in a scenario in which device J 520 and device K 510 are entering into a vehicle (e.g., vehicle 204), each of such devices can compute or otherwise determine their respective location distribution "best guess" based on their respective RSSI signals or group of signals, accelerometer information, and pressure sensor timing. Then each distribution can be shared with other devices and a posterior probability can be computed or otherwise determined that takes into account other probability distributions associated with other device(s) within the vehicle. In certain implementations, probability distributions can be approximated by each device as multivariate Gaussian distributions, and each device can take into consideration the posterior probability resulting from the product of the two independent probabilities to generate a final probability distribution of a location within the vehicle.

The device K 510 can transmit at least information 548 indicative of the device K 510 location to the IRM system 110. In certain embodiments, the device K 510 can transmit information indicative of location of other device(s), such as device J 520. Similarly, the device J 520 can transmit information 552 indicative of the device J 520 location to the IRM system 110. Based at least in part on at least a portion of the information 548 and 552, the IRM system 110 can generate a group of device location estimates at block 556. In one aspect, as part of generating such location estimates, the IRM system 110 can generate information indicative or otherwise representative of device position within the enclosure that contains the IRM system 110. Such information can include, for example, information indicative of relative position of two or more devices, including devices 510 and 520.

Based at least in part on at least a portion of the information indicative of the group of device location estimates and the information indicative of the group of occupant location estimates, at block 560 the IRM system 110 can map the group of occupant location estimates to the group of device location estimates. As described herein, performance or implementation of such mapping can permit allocation or otherwise assignment of a specific device to a specific occupied portion (e.g., an occupied seat) of the enclosure (e.g., vehicle 204) that contains the IRM system 110. At block 564, the IRM system 110 can identify each occupant of the group of occupants based at least on the mapped locations. For instance, as described herein, the IRM system 110 can assign information indicative of an identity associated with a specific device to a portion of the enclosure (e.g., a seat of the vehicle 204).

It should be appreciated that the illustrated order of communication of such location information between devices 510 and 520 can be reversed, and so can the order of the registration information exchange between device K 510 and the IRM system 110 and the device J 520 and the IRM system 110.

Figure 6:
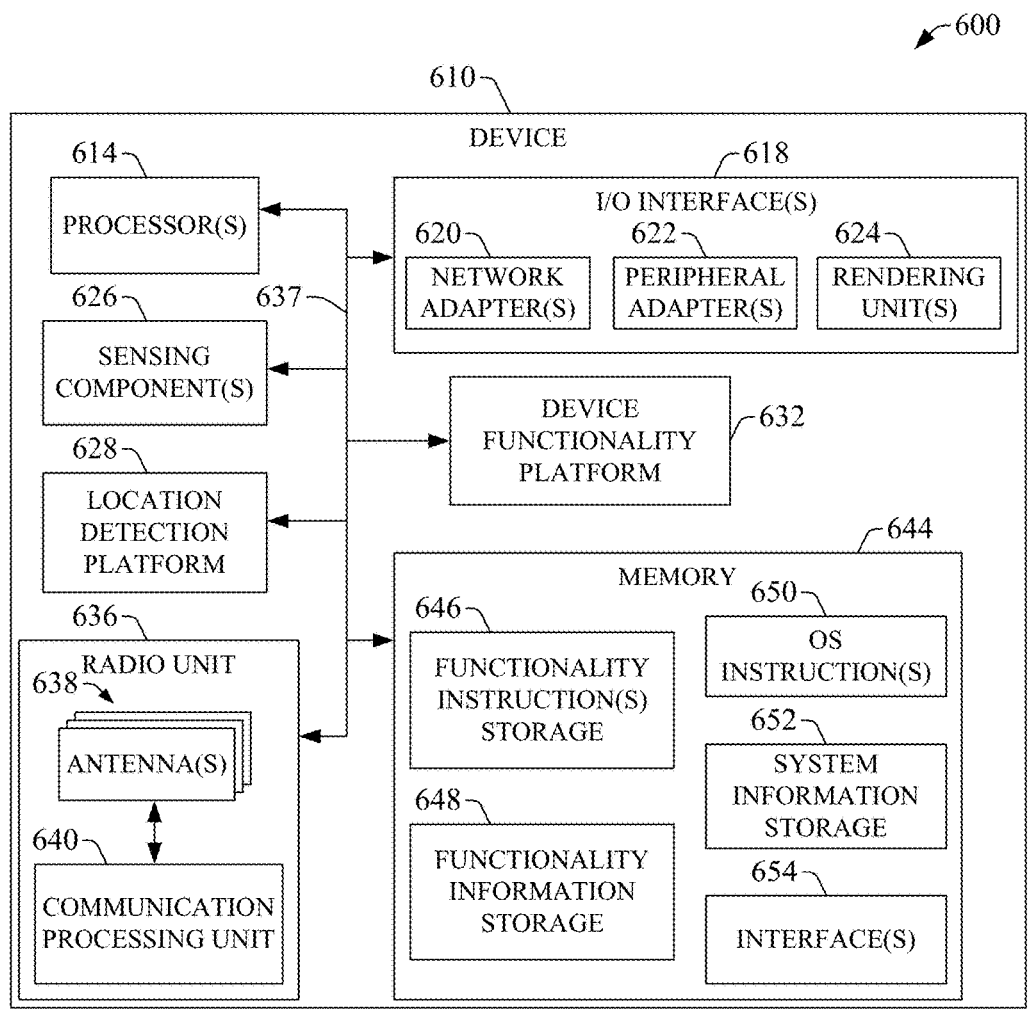
FIG. 6 presents an example computing device in accordance with one or more aspects of the disclosure.

FIG. 6 illustrates a block-diagram of an example embodiment 600 of a device 610 that can communicate or otherwise operate in accordance with at least certain aspects of the disclosure. As illustrated, the device 610 is a computing device. In certain embodiments, the device 610 can embody or can comprise various devices of the disclosure, such as devices 220, 230, or 240. Accordingly, in one aspect, the device 610 can comprise user equipment, including wearable devices. As illustrated, the device 610 can include one or more sensing components 626 that, among other functionality, can detect or can be configured to detect motion of the device 610. For example, the sensing component(s) 626 can include an accelerometer and/or a gyroscope. The accelerometer can detect or otherwise collect and/or supply information indicative of changes in velocity of the device 610, such as increments in velocity or decrements in velocity. In addition, the gyroscope can detect or otherwise collect and/or supply information indicative of positioning (e.g., rotation) of the device 610. In certain embodiments, the accelerometer and the gyroscope can be embodied in or can include solid states devices (such as microelectromechanical system (MEMS)) that can measure or otherwise collect information indicative of velocity and/or acceleration, either linear or angular, of the device 610. In addition or in the alternative, the sensing component(s) 626 can include a gyroscopic compass or other type of compass. It other embodiments, the sensing component(s) 626 can include a magnetometer (such as a solid-state magnetometer, including three-axis magnetometers) that can supply information (e.g., data and/or signaling) indicative or otherwise representative of magnitude and/or orientation of magnetic field. Such data can be utilized or otherwise leveraged by a component within the device 610 in order for the component and thus the device 610 to operate as a compass.

In addition, the device 610 can include a location detection platform 628 that can determine a location estimate of the device 610. In certain embodiments, the location detection platform 628 can determine a location estimate of the device 610 relative to another device that can communicate wirelessly. A relative location estimate can be indicative or otherwise representative of a range (or distance) of another device from the device 610.

Figure 7:
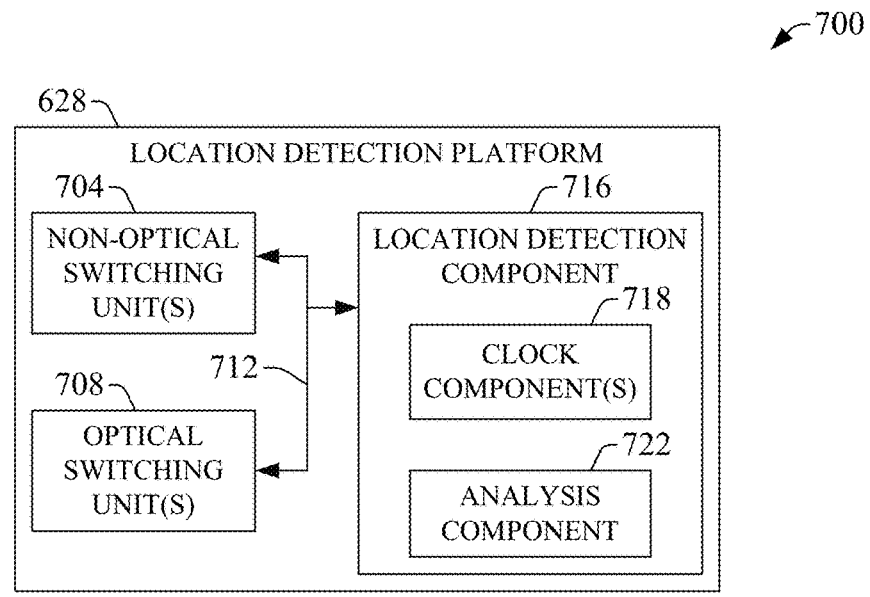
FIGS. 7-8 present example functional elements of a computing device in accordance with one or more aspects of the disclosure.

At least to determine a relative location estimate, in one implementation, the location detection platform 628 can utilize or otherwise leverage time-of-flight (TOF) measurements and related structure and techniques. In another implementation, the location detection platform 628 can measure or otherwise determine the intensity of wireless signals, such as pilot signals, that are received at the device 610, and determine a location estimate based at least in part on at least such intensity and/or a model of electromagnetic radiation propagation over the air (e.g., within the communication environment 140). The wireless signal intensity at a wireless receiver (e.g., radio unit 636) at the device 610 can be a function of the path attenuation (or path decay) that occurs as the wireless signal (which is an electromagnetic wave) propagates from its source through a medium (e.g., the air-interface) and is absorbed and/or scattered within the medium. Thus, in one aspect, the intensity of the received wireless signal can be utilized or otherwise leveraged to estimate a distance from the source of the wireless signal. Embodiment 700 presented in FIG. 7 illustrates one of such embodiments that can permit the foregoing implementations. In one aspect, a unit of the non-optical switching unit(s) 704 can provide (e.g., generate, transmit, generate and transmit, etc.) a wireless signal (e.g., a wireless pilot signal) in a radiofrequency band or a microwave band of the electromagnetic (EM) radiation spectrum, and, in response to detect another wireless signal originating from another device within a line of sight. In order to provide the wireless signal, in certain embodiments, at least one of non-optical switching unit(s) 704 can generate an oscillating signal having a specific frequency or a narrow distribution of frequencies (which can be achieved with a high-Q oscillator) in an RF band or a microwave band. The at least one of the non-optical switching unit(s) 704 can transmit the oscillating signal to the radio unit 636 which can process (e.g., modulate, encode, and the like) the oscillating signal and wirelessly transmit such signal via one or more antennas. The radio unit 636 can process the oscillating signal in accordance with one or more radio technology protocols. The wireless signal can be broadcasted, via the radio unit 636, and thus the relative distance from the device 610 to one or more other devices (not shown in FIG. 6) can be estimated via, for example, a location detection component 716. In a TOF implementation, one of the clock component(s) 718 can determine (e.g., measure) the time that is elapsed between transmission of a pilot wireless signal and reception of a responsive pilot wireless signal. Such a time can indicate or otherwise represent the round trip time (RTT) of the pilot wireless signal. An analysis component 722 can determine (e.g., compute or otherwise calculate) a range of one or more devices from the device 610 based at least on the RTT and a model for ultrasound propagation within an environment (e.g., communication environment 140) in which the device 610 operates.

A similar determination of such range can be accomplished, for example, utilizing optically switched signals (e.g., visible signals, infrared signals, etc.) that can be generated and/or detected by one or more optical switching units 708. In another aspect, the analysis component 722 can determine the bearing of another device with respect to the device 610. To at least such end, for example, the analysis component 722 can collect or otherwise receive motion information indicative or otherwise representative of the movement of the device 610, and can combine or otherwise process (e.g., aggregate, reformat, fuse, a combination thereof, or the like) at least a portion of such information with TOF information in order to generate information indicative or otherwise representative of the distance and/or bearing of the other device by utilizing the characteristics of the optically-switched signals. For example, one of the optical switching units 708 can generate a laser beam that can be utilized to scan a specific region neighboring the device 610 (e.g., the seats' row). In response to the laser scan, the device 610 can detect one or more devices in proximity. The laser signal can be captured or otherwise detected by at least one (e.g., one, two, more than two, each, etc.) of the one or more devices and, in response, the at least one device can transmit an optical response signal (e.g., an optically-switched signal) back to the device 610 (or any other device that performs the laser scan). The optical response signal can be utilized to calculate the round-trip time-of-flight (RTT) from a timing measurement and the bearing by knowing the laser receiver that received the signal. The laser receiver can be included in the optical switching units 708.

In other embodiments, as described herein, the location detection platform 628 can generate a ground-truth estimate, or absolute location estimate. For instance, the location detection platform 628 can collect, via the radio unit 636, for example, timing information (e.g., timing messages) originated at one or antennas that are contained within an IRM system that is functionally coupled to the device 610. Based at least in part on at least a portion of the timing information, the location detection platform 628 can determine (e.g., compute via trilateration and/or triangulation) the ground-truth estimate of the device 610. It should be appreciated that in order to receive such information, the device 610 can register for communication with other device(s) and at least one access point (such as the IRM system 110). In embodiment 700 shown in FIG. 7, which illustrates one of such embodiments, one of the clock component(s) 718 can determine an RTT for a wireless signal (e.g., a pilot signal) transmitted via one or more antennas 638. It should be appreciated that one or more of the clock component(s) 718 can produce clock signals of certain frequency that can permit generating RTTs or other timing information. In certain embodiments, the clock component(s) 718 can include one or more virtual crystal oscillators, having static or configurable frequencies. The analysis component 722 can determine the location estimate for another device in communication with the device 610 based at least on the RTT and timing information received by the location detection platform 628.

As illustrated, the various functional elements of the location detection 628 can be functionally coupled by a bus 712 that can permit exchange of information between two or more of such functional elements. In one aspect, the bus 712 can be a portion of the bus 637.

In connection with the device 610, in an embodiment in which such device embodies the device K 510, the location detection platform 628 can generate, for instance, the device K location estimate 536. Similarly, in scenarios in which the device 610 embodies the device J 520, the location detection platform 628 can generate, for instance, the device J location estimate 532.

The device 610 can have specific functionality, which can be provided by a device functionality platform 632. In an embodiment in which the device 610 embodies or includes a medical device that collects information indicative of or otherwise measures a physical condition, such as blood pressure, heart rate, concentration of sugar and/or a toxin in blood, and the like, of an end-user, the device functionality platform 632 can include circuitry, structure (e.g., electrodes, microfluidic channels, or reactants, etc.), and/or chemicals or other materials suitable for collecting information indicative of or otherwise measuring the physical condition. In such an embodiment, the medical device can be a wearable device. In an embodiment in which the device 610 embodies or includes a goggle or a helmet-mounted visor, the device functionality platform 632 can include circuitry and/or structure (e.g., memory components) that can render information on at least a portion of the surface of the goggle or the helmet-mounted visor that is available for presenting content and/or signaling to an end-user of such equipment. In other embodiments, the device 610 can embody or can include a gaming console, an electronic book reader (or e-reader), or a multimedia composition device, such as a camera. In such embodiments, the device functionality platform 632 can include circuitry and/or structure (e.g., memory components) suitable for permitting gaming, reading, or generation of media assets (e.g., photos, video segments, and the like).

It should be appreciated that, based at least on the specific functionality of the device 610, the device functionality platform 632 can incorporate, supplement, and/or complement at least one of the input/output (I/O) interface(s) 618.

In addition, the device functionality platform 632 can operate in conjunction (e.g., concurrently or sequentially) with other functional elements of the device 610, such as the radio unit 636, the sensing component(s) 626, and/or the location detection platform 628. For example, various functional elements and associated circuitry that can embody the device functionality platform 632 can permit data input through one or more gestures (e.g., touch, speech, motion), or one or more communication protocols. Such functional elements can include a keypad, a touch screen, a microphone, a camera, a bar code reader, a radio frequency ID (RFID) reader, an infrared (IR) wireless-based reader, or the like.

Figure 8:
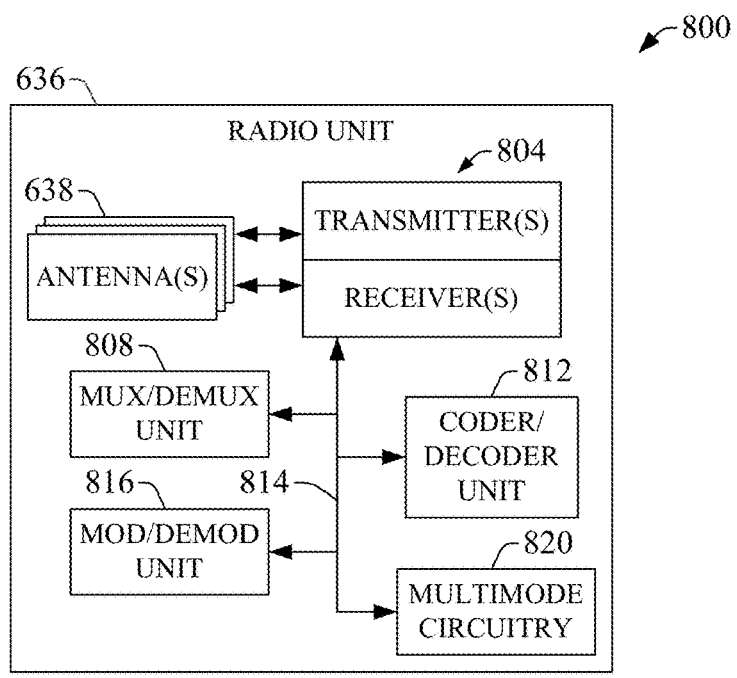

The device 610 can operate as a wireless device and can embody or can comprise a communication device of the disclosure, such as one of devices 220, 230, or 240. To permit wireless communication with a device (e.g., device 160), in one aspect, the device 610 includes a radio unit 636 having one or more antennas 638 and a communication processing unit 640. In one embodiment, e.g., example embodiment 800 presented in FIG. 8, the communication processing unit 640 can comprise a set of one or more transmitters/receivers 804, and components therein (e.g., amplifiers, filters, etc.), functionally coupled to a multiplexer/demultiplexer (mux/demux) unit 808, a modulator/demodulator (mod/demod) unit 816 (also referred to as modem 816), and a coder/decoder unit 812 (also referred to as codec 812). Each of the transmitter(s)/receiver(s) 804 can form respective transceiver(s) that can transmit and receive wireless signal (e.g., electromagnetic radiation) via the one or more antennas 638.

Electronic components and associated circuitry, such as mux/demux unit 808, codec 812, and modem 816 can permit or otherwise facilitate processing and manipulation, e.g., coding/decoding, deciphering, and/or modulation/demodulation, of wireless signal(s) received by the device 610 and wireless signal(s) to be transmitted by the same. In one aspect, received and transmitted wireless signals can be modulated and/or coded, or otherwise processed, in accordance with one or more radio technology protocols (e.g., 3rd Generation Partnership Project (3GPP) Universal Mobile Telecommunication System (UMTS), 3GPP Long Term Evolution (LTE), or the like).

The electronic components in the described communication processing unit 640, including the one or more transmitters/receivers 804, can exchange information (e.g., data, metadata, code instructions, signaling and related payload data, combinations thereof, or the like) through a bus 814, which can embody or can comprise at least one of a system bus, an address bus, a data bus, a message bus, a reference link or interface, a combination thereof, or the like. Each of the one or more transmitters/receivers 804 can convert a signal from analog to digital and vice versa. In addition or in the alternative, the transmitter(s)/receiver(s) 804 can divide a single data stream into multiple parallel data streams, or perform the reciprocal operation. Such operations may be conducted as part of various multiplexing schemes. As illustrated, the mux/demux unit 808 is functionally coupled to the one or more transmitters/receivers 804 and can permit processing of signals in time and frequency domain. In one aspect, the mux/demux unit 808 can multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), and/or space division multiplexing (SDM). In addition or in the alternative, in another aspect, the mux/demux unit 808 can scramble and spread information (e.g., codes) according to most any code, such as Hadamard-Walsh codes, Baker codes, Kasami codes, polyphase codes, and the like. The modem 816 can modulate and demodulate information (e.g., data, metadata, and/or signaling) according to various modulation techniques, such as frequency modulation (e.g., frequency-shift keying), amplitude modulation (e.g., M-ary quadrature amplitude modulation (QAM), with M a positive integer; amplitude-shift keying (ASK)); phase-shift keying (PSK); and the like). In addition, the processor(s) 614 can permit or otherwise facilitate the device 610 to process data (e.g., symbols, bits, or chips) for multiplexing/demultiplexing, modulation/demodulation (such as implementing direct and inverse fast Fourier transforms) selection of modulation rates, selection of data packet formats, inter-packet times, and the like.

The codec 812 can operate on information (e.g., data, metadata, and/or signaling) in accordance with one or more coding/decoding schemes suitable for communication, at least in part, through the one or more transceivers formed from respective transmitter(s)/receiver(s) 804. In one aspect, such coding/decoding schemes, or related procedure(s), can be retained as a group of one or more computer-accessible instructions (computer-readable instructions, computer-executable instructions, or a combination thereof) in memory 644. In a scenario in which wireless communication among the device 610 and another device (e.g., device 220) utilizes or otherwise leverages multiple-input multiple-output (MIMO), multiple-input single-output (MISO), single-input multiple-output (SIMO), or single-input single-output (SISO) operation, the codec 812 can implement at least one of space-time block coding (STBC) and associated decoding, or space-frequency block coding (SFBC) and associated decoding. In addition or in the alternative, the codec 812 can extract or otherwise acquire information from data streams coded in accordance with spatial multiplexing scheme. In one aspect, at least to decode received information (e.g., data, metadata, and/or signaling), the codec 812 can implement at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec 812 can utilize, at least in part, mux/demux unit 808 and mod/demod unit 816 to operate in accordance with aspects described herein.

Multimode circuitry 820 can permit the radio unit 636 to operate in multiple communication modes through various radio network technologies (e.g., second generation (2G), third generation (3G), fourth generation (4G)) or deep-space satellite-based communication in accordance with disparate technical specifications (or standard protocols) for the radio network technologies or such a satellite communication. The various radio network technologies can be part of the set of radio technologies described herein. In one aspect, the multimode circuitry 820 can permit the radio unit 636 to operate in accordance with standard protocols specific to a telecommunication mode of operation, e.g., Long Term Evolution (LTE)-based communication. In another aspect, the multimode circuitry 824 can be scheduled to operate concurrently in various modes or within a multitask paradigm in which the multimode circuitry 820 can operate in a dedicated mode for a specific period.

The device 610 can operate in a variety of wireless environments having wireless signals conveyed in different electromagnetic radiation (EM) frequency bands. To at least such end, the communication processing unit 640 can process (code, decode, format, etc.) wireless signals within a set of one or more EM frequency bands (also referred to as frequency bands) comprising one or more of radio frequency (RF) portions of the EM spectrum, microwave portion(s) of the EM spectrum, or infrared (IR) portion of the EM spectrum. In one aspect, the set of one or more frequency bands can include at least one of (i) all or most licensed EM frequency bands, or (ii) all or most unlicensed frequency bands currently available for telecommunication.

As illustrated, the device 610 comprises one or more processors 614 that can permit, at least in part, the functionality of one or more functional elements of the device 610 in accordance with at least certain aspects described herein. While in the example embodiment 600, the one or more processors 614 are illustrated as external to the various functional elements (e.g., component(s), interface(s), platform(s), node(s)) of the device 610, in an additional or an alternative embodiment, the one or more processors 614 can be distributed among a plurality of such functional elements. The one or more processors 614 can be functionally coupled a memory 644 and to at least on (e.g., one, two, more than two, or each) functional element within the device 610 via bus 637. In certain implementations, the bus 637 can be embodied in or can comprise one or more of a memory bus, a system bus, an address bus, a message bus, a power bus, or one or more reference links or interface(s).

In one aspect, the memory 644 can contain one or more memory elements 646 having computer-accessible instructions encoded thereon. The one or more memory elements 646 are referred to as functionality instruction(s) storage 646. In certain implementations, the functionality instructions(s) storage 646 can be embodied in a removable element, such as a subscriber identification module (SIM) card storage, a universal integrated circuit card (UICC) storage, or a removable user identity module (RUIM). In another aspect, the memory 644 can comprise functionality information storage 648, which can include information specific to sensing movement (via one or more of sensing component(s) 626, for example) and/or determining a location estimate of the device 610 in accordance with aspects of the disclosure.

Figure 9A:
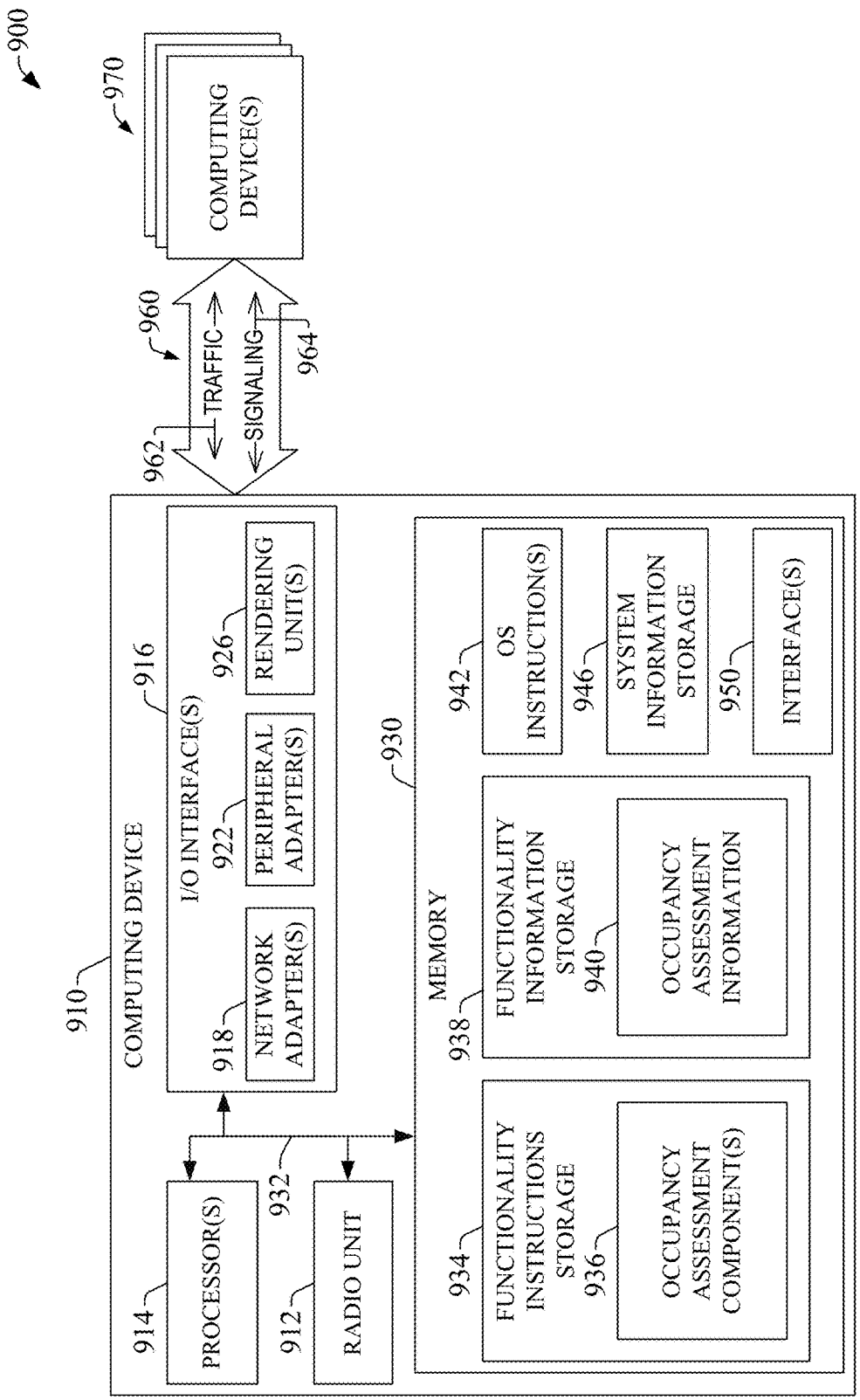
FIG. 9A presents an example operational environment in accordance with one or more aspects of the disclosure.
Figure 9B:
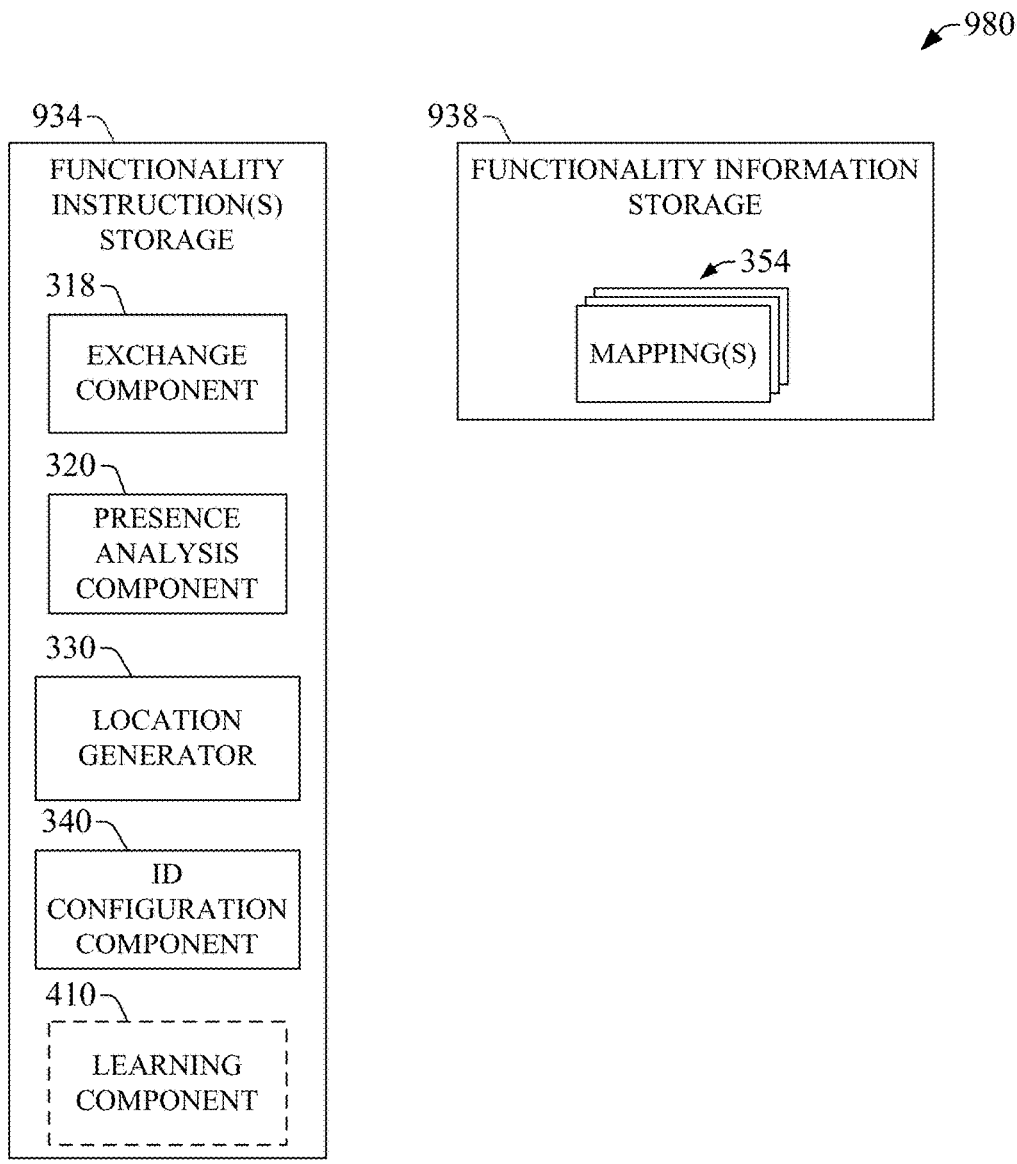
FIG. 9B presents example computer-readable non-transitory storage media in accordance with one or more aspects of the disclosure.
Figure 10:
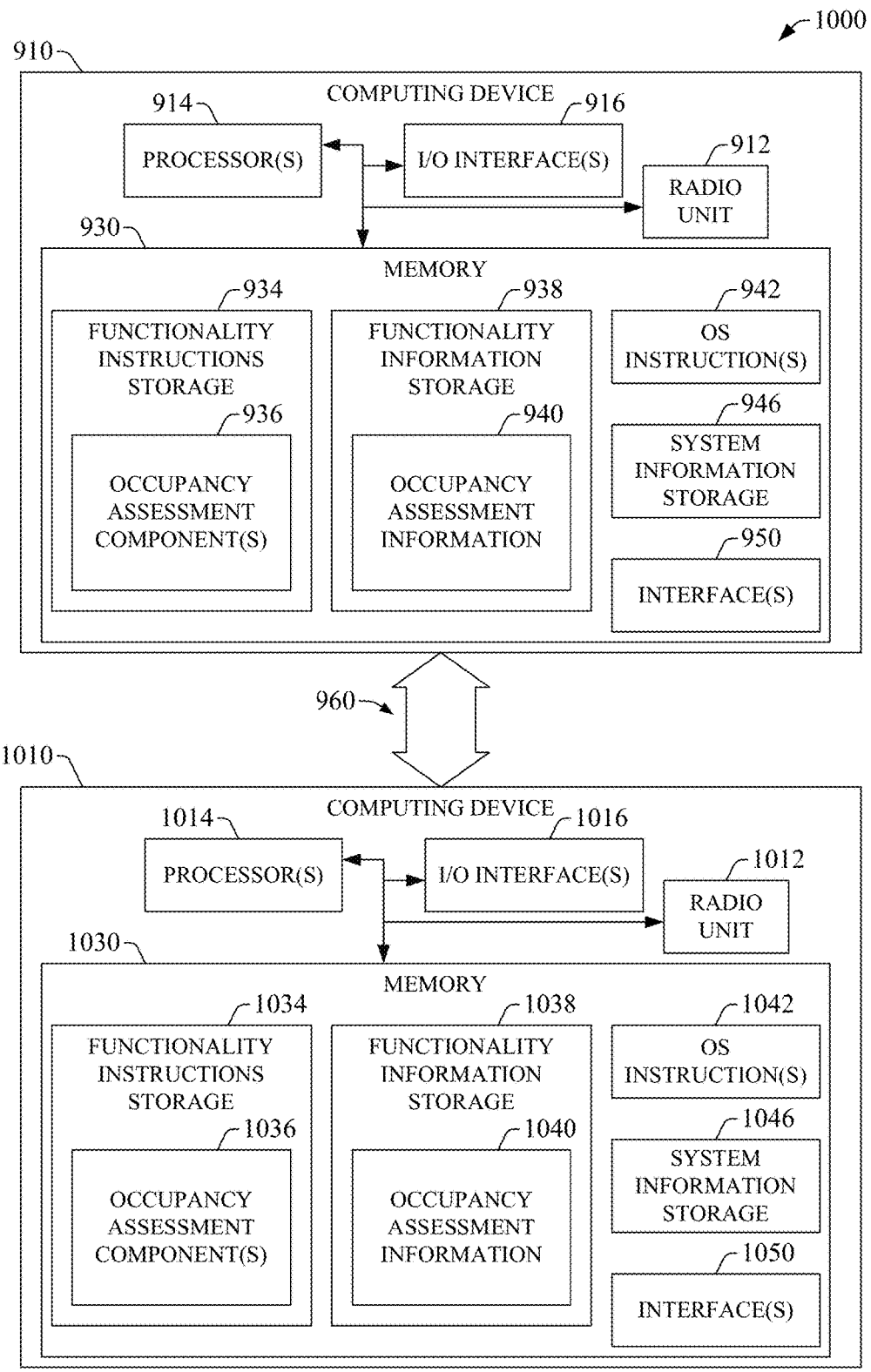
FIG. 10 presents another example operational environment in accordance with one or more aspects of the disclosure.

FIGS. 9A, 9B, and 10 illustrate block diagrams of example operational environments, and example associated computer-readable media, for vehicle occupancy assessment in accordance with one or more aspects of the disclosure. These example operational environments are only illustrative and are not intended to suggest or otherwise convey any limitation as to the scope of use or functionality of the operating environments' architecture. In addition, the operational environments should not be interpreted as having any dependency or requirement relating to any one or combination of components illustrated in these example operational environments. These operational environments can embody or can comprise the IRM system 110, or the IRM system 110 and one or more of the devices 150₁-150_N.

The operational environment 900 represents an example software implementation of the various aspects or features of the disclosure in which the processing or execution of operations described in connection with the vehicle occupancy assessment described herein can be performed in response to execution of one or more software components at the computing device 910. It should be appreciated that the one or more software components can render the computing device 910, or any other computing device that contains such components, a particular machine for vehicular occupancy assessment as described herein, among other functional purposes. A software component can be embodied in or can comprise one or more computer-accessible instructions, e.g., computer-readable and/or computer-executable instructions. In one scenario, at least a portion of the computer-accessible instructions can embody at least a part of one or more of the example methods presented in FIGS. 11-13 and various call flows described herein. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can assembled into one or more program modules, for example, that can be compiled, linked, and/or executed at the computing device 910 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 910 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the vehicle occupancy assessment described herein can comprise personal computers; server computers; laptop devices; handheld computing devices, such as mobile tablets; wearable computing devices; and multiprocessor systems. Additional examples can include set-top boxes, programmable consumer electronics, network PCs, minicomputers, mainframe computers, blade computers, programmable logic controllers, distributed computing environments that comprise any of the above systems or devices, and the like.

As illustrated, the computing device 910 can comprise one or more processors 914, one or more input/output (I/O) interfaces 916, a radio unit 912, a memory 930, and a bus architecture 932 (also termed bus 932) that functionally couples various functional elements of the computing device 910. The radio unit 912 can have substantially the same architecture and functionality as that of the radio unit 636 described herein. The bus 932 can include at least one of a system bus, a memory bus, an address bus, or a message bus, and can permit exchange of information (data, metadata, and/or signaling) between the processor(s) 914, the I/O interface(s) 916, and/or the memory 930, or respective functional element therein. In certain scenarios, the bus 932 in conjunction with one or more internal programming interfaces 950 (also referred to as interface(s) 950) can permit such exchange of information. In scenarios in which processor(s) 914 include multiple processors, the computing device 910 can utilize parallel computing.

The I/O interface(s) 916 permit communication of information between the computing device and an external device, such as another computing device, e.g., a network element or an end-user device. Such communication can include direct communication or indirect communication, such as exchange of information between the computing device 910 and the external device via a network or elements thereof. As illustrated, the I/O interface(s) 916 can comprise one or more of network adapter(s) 918, peripheral adapter(s) 922, and rendering unit(s) 926. Such adapter(s) can permit or facilitate connectivity between the external device and one or more of the processor(s) 914 or the memory 930. For example, the peripheral adapter(s) 922 can include a group of ports, which can comprises at least one of parallel ports, serial ports, Ethernet ports, V.35 ports, or X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394. In one aspect, at least one of the network adapter(s) 918 can couple functionally the computing device 910 to one or more computing devices 970 via one or more traffic and signaling pipes 960 that can permit or facilitate exchange of traffic 962 and signaling 964 between the computing device 910 and the one or more computing devices 970. Such network coupling provided at least in part by the at least one of the network adapter(s) 918 can be implemented in a wired environment, a wireless environment, or both. The information that is communicated by the at least one of the network adapter(s) 918 can result from implementation of one or more operations in a method of the disclosure. Such output can be any form of visual representation, including, but not limited to, textual, graphical, animation, audio, tactile, and the like. In certain scenarios, each of the computing device(s) 970 can have substantially the same architecture as the computing device 910. In addition or in the alternative, the rendering unit(s) 926 can include functional elements (e.g., lights, such as light-emitting diodes; a display, such as liquid crystal display (LCD), a plasma monitor, a light emitting diode (LED) monitor, an electrochromic monitor; combinations thereof; or the like) that can permit control of the operation of the computing device 910, or can permit conveying or revealing the operational conditions of the computing device 910.

In one aspect, the bus 932 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, a Universal Serial Bus (USB) and the like. The bus 932, and all buses described herein can be implemented over a wired or wireless network connection and each of the subsystems, including the processor(s) 914, the memory 930 and memory elements therein, and the I/O interface(s) 916 can be contained within one or more remote computing devices 970 at physically separate locations, connected through buses of this form, in effect implementing a fully distributed system.

The computing device 910 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 910, and can comprise, for example, both volatile and non-volatile media, and removable and/or non-removable media. In one aspect, the memory 930 can comprise computer-readable media in the form of volatile memory, such as random access memory (RAM), and/or non-volatile memory, such as read-only memory (ROM).

The memory 930 can comprise functionality instructions storage 934 and functionality information storage 938. The functionality instructions storage 934 can comprise computer-accessible instructions that, in response to execution (by at least one of the processor(s) 914), can implement one or more of the functionalities of the disclosure. The computer-accessible instructions can embody or can comprise one or more software components illustrated as occupancy assessment component(s) 936. In one scenario, execution of at least one component of the occupancy assessment component(s) 936 can implement one or more of the example methods 1100 through 1400. For instance, such execution can cause a processor that executes the at least one component to carry out a disclosed example method. It should be appreciated that, in one aspect, a processor of the processor(s) 914 that executes at least one of the occupancy assessment component(s) 936 can retrieve information from or retain information in a memory element 940 in the functionality information storage 938 in order to operate in accordance with the functionality programmed or otherwise configured by the occupancy assessment component(s) 936. Such information can include at least one of code instructions, information structures, or the like. At least one of the one or more interfaces 950 (e.g., application programming interface(s)) can permit or facilitate communication of information between two or more components within the functionality instructions storage 934. The information that is communicated by the at least one interface can result from implementation of one or more operations in a method of the disclosure. In certain embodiments, one or more of the functionality instructions storage 934 and the functionality information storage 938 can be embodied in or can comprise removable/non-removable, and/or volatile/non-volatile computer storage media.

At least a portion of at least one of the occupancy assessment component(s) 936 or occupancy assessment information 940 can program or otherwise configure one or more of the processors 914 to operate at least in accordance with the functionality described herein. In one embodiment, e.g., embodiment 980 in FIG. 9B, the occupancy assessment component(s) 936 contained in the functionality instruction(s) storage 934 can include the exchange component 318, the presence analysis component 320, the location generator 330, the ID configuration component 340, and (in certain embodiments or optionally) the learning component 410. It should be recognized that in such embodiment, hardware or firmware functional elements of the exchange component 318 can be embodied in suitable components of the computing device 910. For instance, at least one of the processors 914 and at least one of the I/O interface(s) 916 (e.g., a network adapter of the network adapter(s) 918) can embody a communication unit of the exchange component 318. In addition, in embodiment 980, the functionality information storage 938 can comprise the mapping(s) 354. One or more of the processor(s) 914 can execute at least one of such components and leverage at least a portion of the information in the functionality information storage 938 in order to provide a vehicle occupancy assessment in accordance with one or more aspects described herein.

It should be appreciated that, in certain scenarios, the functionality instruction(s) storage 934 can embody or can comprise a computer-readable non-transitory storage medium having computer-accessible instructions that, in response to execution, cause at least one processor (e.g., one or more of processor(s) 914) to perform a group of operations comprising the operations or blocks described in connection with the disclosed methods.

In addition, the memory 930 can comprise computer-accessible instructions and information (e.g., data and/or metadata) that permit or facilitate operation and/or administration (e.g., upgrades, software installation, any other configuration, or the like) of the computing device 910. Accordingly, as illustrated, the memory 930 can comprise a memory element 942 (labeled operating system (OS) instruction(s) 942) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architecture complexity of the computing device 910 can dictate a suitable OS. The memory 930 also comprises a system information storage 946 having data and/or metadata that permits or facilitate operation and/or administration of the computing device 910. Elements of the OS instruction(s) 942 and the system information storage 946 can be accessible or can be operated on by at least one of the processor(s) 914.

It should be recognized that while the functionality instructions storage 934 and other executable program components, such as the OS instruction(s) 942, are illustrated herein as discrete blocks, such software components can reside at various times in different memory components of the computing device 910, and can be executed by at least one of the processor(s) 914. In certain scenarios, an implementation of the occupancy assessment component(s) 936 can be retained on or transmitted across some form of computer-readable media.

The computing device 910 and/or one of the computing device(s) 970 can include a power supply (not shown), which can power up components or functional elements within such devices. The power supply can be a rechargeable power supply, e.g., a rechargeable battery, and it can include one or more transformers to achieve a power level suitable for operation of the computing device 910 and/or one of the computing device(s) 970, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 918) to connect operationally to the conventional power grid. In another aspect, the power supply can include an energy conversion component, such as a solar panel, to provide additional or alternative power resources or autonomy for the computing device 910 and/or one of the computing device(s) 970.

The computing device 910 can operate in a networked environment by utilizing connections to one or more remote computing devices 970. As an illustration, a remote computing device can be a personal computer, a portable computer, a server, a router, a network computer, a peer device or other common network node, and so on. As described herein, connections (physical and/or logical) between the computing device 910 and a computing device of the one or more remote computing devices 970 can be made via one or more traffic and signaling pipes 960, which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

In one or more embodiments, such as example embodiment 1000 shown in FIG. 10, one or more of the disclosed methods can be practiced in distributed computing environments, such as grid-based environments, where tasks can be performed by remote processing devices (computing device(s) 970) that are functionally coupled (e.g., communicatively linked or otherwise coupled) through a network having traffic and signaling pipes and related network elements. In a distributed computing environment, in one aspect, one or more software components (such as program modules) can be located in both a local computing device 910 and at least one remote computing device, such as computing device 1010. As illustrated and described herein, the at least one remote computing device, e.g., computing device 1010, can have substantially the same architecture and associated functionality as the computing device 910. For instance, the computing device 1010 can comprise processor(s) 1014, I/O interface(s) 1016, a radio unit 1012, and a memory 1030, where a bus architecture (represented with arrows in FIG. 10) can couple functionally two or more of such elements. The functionality of such functional elements of computing device 1010 can be substantially the same as that of counterpart functional elements in computing device 910. The memory 1030 can comprise a functionality instructions storage 1034 having one or more occupancy assessment component(s) 1036, and a functionality information storage 1038 having occupancy assessment information 1040. The memory 1030 also can comprise OS instruction(s) 1042 and system information storage 1046 that can permit, at least in part, operation and/or administration of the computing device 1010. One or more internal programming interfaces 1050 (represented as interface(s) 1050 in FIG. 10) can permit or facilitate exchange of information between the occupancy assessment component(s) 1036 and the functionality information storage 1038. In a scenario in which several components are present in the group of occupancy assessment component(s) 1036, at least one interface of the interface(s) 1050 can permit or facilitate exchange of information between at least two of such components.

In one implementation, the computing device 910 can embody or can comprise the exchange component 318, the presence analysis component 320 and the location generator 330, whereas the computing device 1010 can comprise the ID configuration component 340 and/or the learning component 410 (in embodiments in which such component is present. Other distribution of the exchange component 318, the presence analysis component 320, the location generator 330, the ID configuration component 340, and the learning component 410 can be implemented. Similarly, the mapping(s) 354 also can be distributed between respective memory element(s) or storage device(s) of the computing device 910 and the computing device 1010.

In view of the aspects described herein, example methods that can be implemented in accordance with the disclosure can be better appreciated with reference to the flowcharts in FIGS. 11-14. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It should be appreciated that the methods of the disclosure can be retained on an article of manufacture, or computer-readable medium, to permit or facilitate transporting and transferring such methods to a computing device (e.g., a desktop computer; a mobile computer, such as a tablet, or a smartphone; a gaming console; a mobile telephone; a blade computer; a programmable logic controller; and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

Figure 11:
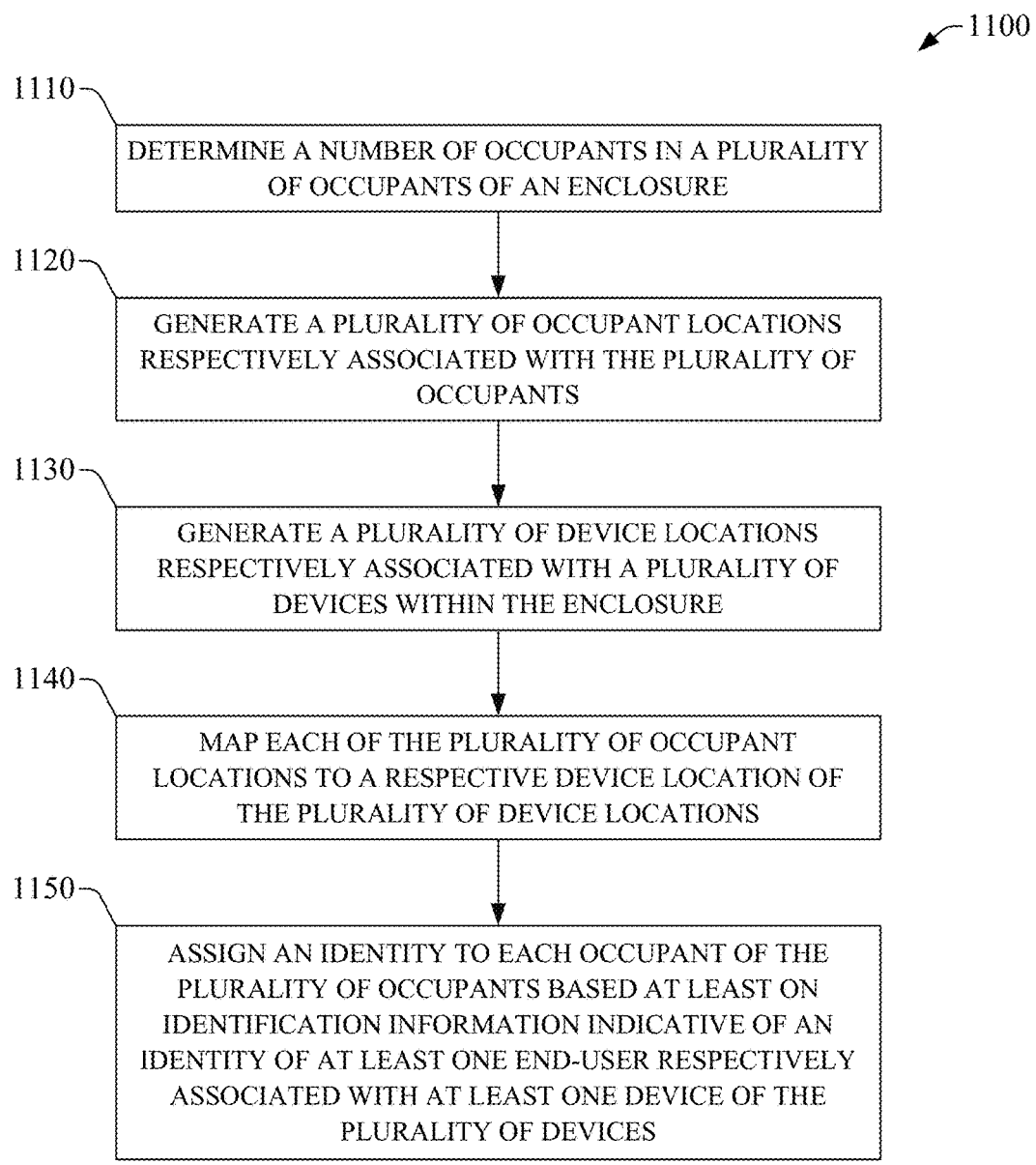
FIGS. 11-14 present example methods in accordance with one or more aspects of the disclosure.

FIG. 11 presents a flowchart of an example method 1100 for assessing occupancy of an enclosure according to at least certain aspects of the disclosure. One or more computing devices having at least one processor or being functionally coupled to at least one processor can implement (e.g., compile, execute, compile and execute, etc.) one or more blocks of the subject example method 1100. In other scenarios, one or more blocks of the example method 1100 can be implemented in a distributed fashion by two or more computing devices contained in a system. Each of the two or more computing devices can have at least one processor or can be functionally coupled to at least one processor, where such processor(s) can implement at least one of the one or more blocks.

At block 1110 a number of occupants in a plurality of occupants of an enclosure is determined. The block 1110 can be referred to as a determining operation that, in one aspect, can comprise ascertaining a number of seats within the enclosure that are occupied. As described herein, in one implementation, occupation state of a seat can be determined via, at least in part, signaling received from a pressure sensor functionally coupled to an air bladder in the seat. For example, the ascertaining can comprise acquiring pressure sensor information indicative of at least two seats within the enclosure being occupied. In another implementation, imaging information associated with the interior of the enclosure can be accessed in order to determine the occupation state of a seat. Such information can be acquired, at least in part, from a camera having a field of view directed to the interior of the enclosure. As an illustration, the ascertaining can comprise accessing imaging information indicative of at least two seats within the enclosure being occupied, where the imaging information can be acquired at least in part from a camera having a field of view directed to the interior of the enclosure.

At block 1120, a plurality of occupant location estimates (also referred to as occupant locations) respectively associated with the plurality of occupants is generated. As described herein, a computing platform or computing system that implements (e.g., executes) the subject block 1120 can generate the plurality of occupant locations. In one aspect, such locations can be generated based at least in part on information indicative of positioning of one or more occupants of the vehicle. At block 1130, a plurality of device location estimates (or device locations) respectively associated with a plurality of devices (e.g., devices $150_1$-$150_N$) within the enclosure is generated. In scenarios in which at least one device of the plurality of devices is registered for communication with a computing platform or computing system that can implement the example method 1100, generating the plurality of device locations can comprise transmitting information indicative of each of the plurality of occupant locations to each of the plurality of devices. In certain embodiments, the computing platform or the computing system can include one or more processors and can embody or can comprise the IRM system 110. In one embodiment, blocks 1120 and 1130 can be performed concurrently or nearly concurrently and location information of occupants and/or devices can be determined via at least correlation of information collected or otherwise received from one or more probes and information received form at least one device of the plurality of devices. For instance, as described herein, correlation between information indicative of motion of at least one device of the plurality of devices can be correlated with pressure sensor information (e.g., data and/or signaling) associated with onset of occupation of a seat within the enclosure, the seat containing or otherwise coupled to one or more of the pressure sensors that supply the pressure sensor information.

In certain embodiments, as described herein (see, for example, FIG. 5), the example method 1100 can include a registration block at which each of the plurality of devices is registered with the computing platform or computing system prior to determining the number of occupants in the plurality of occupants in the enclosure. The registration block can be referred to as a registering operation and can permit communicating wirelessly between the computing platform or the computing system and each device.

At block 1140, each of the plurality of occupant locations is mapped to a respective device location of the plurality of device locations. In one embodiment, the ID configuration component 340 can map each of the plurality of occupant location to a respective device location of the plurality of device locations. It should be appreciated that by mapping an occupant location to a device location, the device location is associated with the occupant location.

At block 1150, an identity is assigned to each occupant of the plurality of occupants based at least on identification information (e.g., data, metadata, and/or signaling) indicative of an identity of at least one end-user respectively associated with at least one device of the plurality of devices. Block 1150 can be referred to as an assigning operation and, in one aspect, can comprise receiving, at the computing platform, at least a portion of the identification information from each device of the plurality of devices. In one implementation, the information can comprise data indicative of an identity of an end-user associated with the device.

In one embodiment, the example method 1100 can comprise generating a data structure indicative of at least one of a specific arrangement of the plurality of occupants within the enclosure or identities of the plurality of occupants within the enclosure. As described herein, a specific seat map or seat configuration of the enclosure can be leveraged to generate such arrangement. In addition or in the alternative, at least to generate such arrangement, the example method 1100 can comprise receiving from each of the plurality of devices, a device location and at least one positioning metric, wherein each positioning metric of the at least one positioning metric is indicative of a likelihood that a device associated with the positioning metric is positioned at a specific device location.

Figure 12:
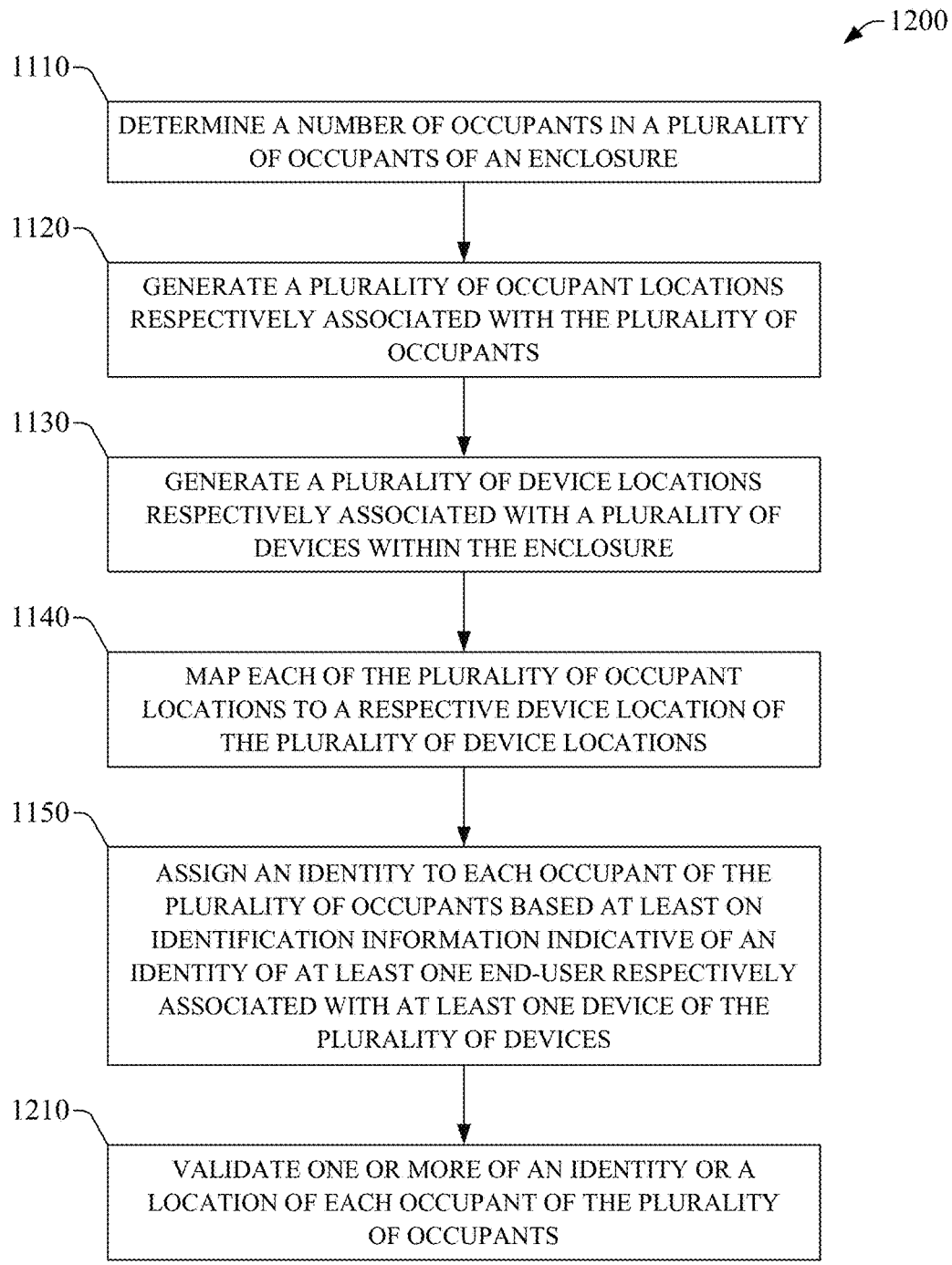

In certain embodiments, as illustrated by the example method 1200 in FIG. 12, the example method 1100 can include a validation block 1210, at which one or more of an identity or a location of each occupant of the plurality of occupants is validated. In one aspect, the validation block 1210 can be referred to as a validating operation and can comprise receiving confirmation information from a device associated with an occupant of the enclosure. As described herein, the confirmation information can comprise data or any other information object indicative of the accuracy of the identity and the location of an occupant. In another aspect, the validating operation can comprise receiving rectification information (e.g., a correction or an adjustment) from a device associated with the occupant, where the rectification information comprises data indicative of an adjustment to one or more of the identities or one or more locations of respective occupant(s).

Figure 13:
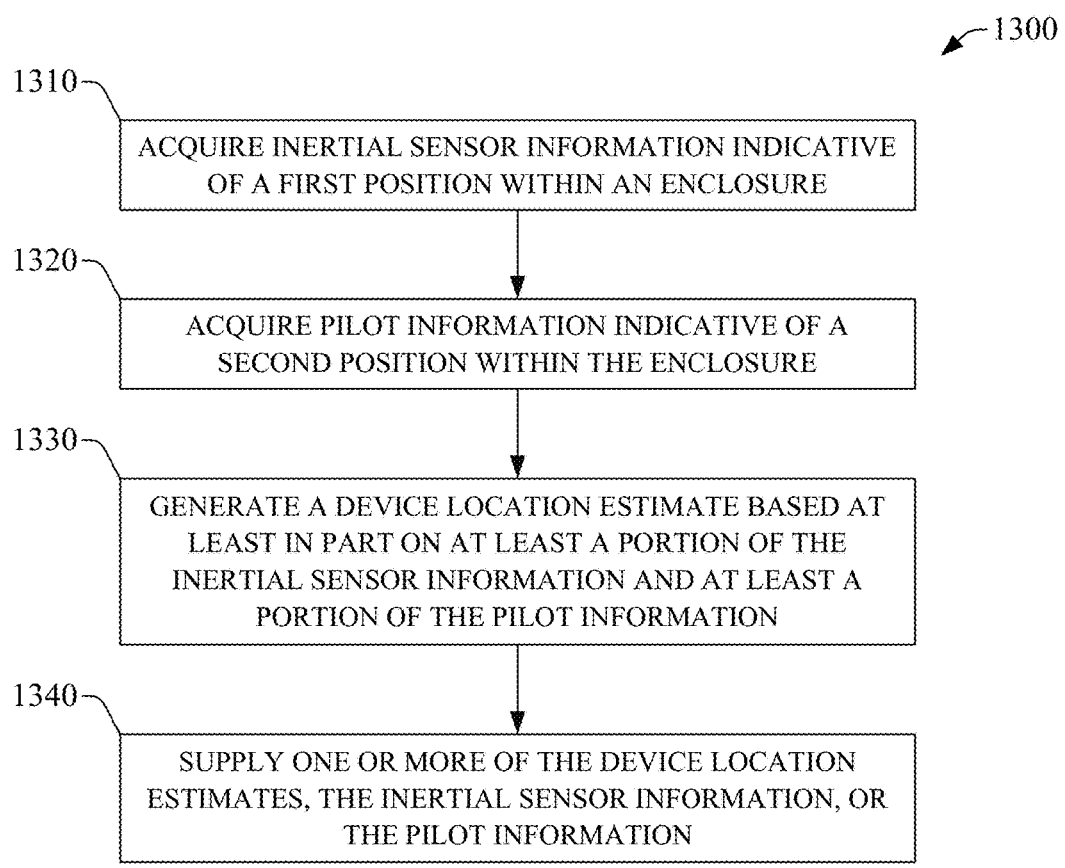

FIG. 13 illustrates an example method 1300 for acquiring a device location estimate according to at least certain aspects of the disclosure. One or more computing devices having at least one processor or being functionally coupled to at least one processor can implement (e.g., compile, execute, compile and execute, etc.) one or more blocks of the subject example method 1300. For example, the one or more computing device can include at least one of the devices $150_1$-$150_N$. In other scenarios, one or more blocks of the example method 1300 can be implemented in a distributed fashion by two or more computing devices contained in an operational environment, such as a system or platform. Each of the two or more computing devices can have at least one processor or can be functionally coupled to at least one processor, where such processor(s) can implement at least one of the one or more blocks.

At block 1310, inertial sensor information indicative of a first position within an enclosure is acquired. In one embodiment, one or more of the sensing component(s) 626 can generate or otherwise acquire at least a portion of the inertial sensor information. At block 1320, pilot information indicative of a second position within the enclosure is acquired. In one embodiment, the location detection platform and/or the radio unit 636 acquire at least a portion of the pilot information. At block 1330, a device location estimate is generated based at least in part on at least a portion of the inertial sensor information and at least a portion of the pilot information.

At block 1340, one or more of the device location estimates, the inertial sensor information, or the pilot information is supplied. Block 1340 can be referred to as a supplying operation and, in certain scenarios, can comprise registering the computing device with another computing device (e.g., a functional element of the IRM system 110) in order to permit wireless communication between such devices. In one aspect, as part of such communication, identification information indicative of an identity of an end-user associated with a device of a plurality of devices within the enclosure can be transmitted to the computing device that registered the computing device that transmits the identification information. In another aspect, the transmitting comprises transmitting one or more of facial recognition information associated with the at least one end-user, or audio-based recognition information associated with the at least one end-user.

Figure 14:
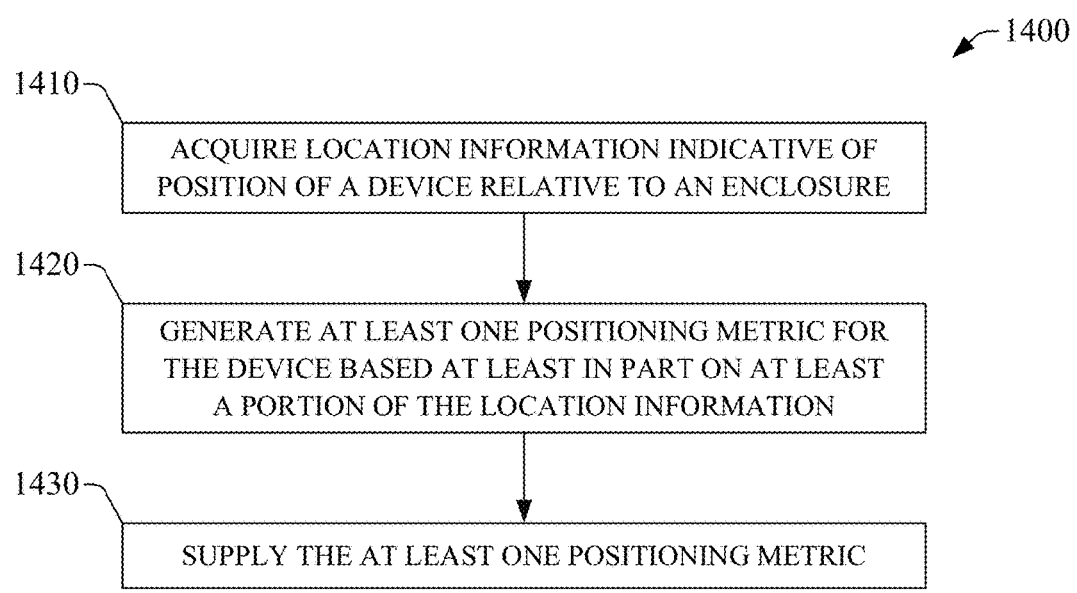

FIG. 14 illustrates an example method 1400 for acquiring a position distribution of one or more devices within an enclosure according to at least certain aspects of the disclosure. One or more computing devices that can implement the example method 1300 also can implement the subject example method 1400. At block 1410, location information indicative of position of a device relative to an enclosure is acquired. At block 1420, at least one positioning metric for the device is generated based at least in part on at least a portion of the location information. Each positioning metric of the at least one positioning metric can be indicative of a likelihood that the device is at a specific position within the enclosure.

At block 1430, the at least one positioning metric is supplied. In one aspect, such positioning metric(s) can be broadcast to other devices, which may be configured to access (e.g., receive, decode, receive and decode, or the like) the positioning metric(s). In another aspect, one or more of the at least one positioning metric can be transmitted to a specific computing device, such as one of the devices $150_1$-$150_N$, or a component of the IRM system 110. Block 1430 can be referred to as a supplying operation and, in certain scenarios, can comprise registering with the computing device with another computing device in order to permit wireless communication between such devices. In one scenario, the registering operation can be implemented prior to acquiring the pilot information.

Further or alternative embodiments of the disclosure emerge from the description herein and annexed drawings. In one example embodiment, the disclosure provides an example method for assessing occupancy. The example method comprises determining, by a computing platform (such as IRM system 110), a number of occupants in a plurality of occupants of an enclosure (e.g., a vehicle). Determining the number of occupants in the plurality of occupants of the enclosure can comprise ascertaining a number of seats within the enclosure that are occupied. In one aspect, the ascertaining can comprise acquiring pressure sensor information indicative of at least two seats within the enclosure being occupied. In another aspect, the ascertaining can comprise accessing imaging information indicative of at least two seats within the enclosure being occupied, the imaging information is acquired at least in part from a camera having a field of view directed to the interior of the enclosure.

The example method also can include generating, by the computing platform, a plurality of occupant locations within the enclosure, for each of the plurality of occupant locations is associated with an occupant in the plurality of occupants; generating, by the computing platform, a plurality of device locations within the enclosure, each of the plurality of device locations is associated with a device in a plurality of devices respectively associated with the plurality of occupants; mapping, by the computing platform, each of the plurality of occupant locations to a respective device location of the plurality of device locations. In addition the example method can include assigning, by the computing platform, an identity to each occupant of the plurality of occupants based at least on identification information indicative of an identity of at least one end-user respectively associated with at least one device of the plurality of devices. In the example method, in one aspect, the mapping can comprise associating each of the plurality of devices to a respective occupant of the plurality of occupants.

In another example embodiment, in the example method the assigning can comprise receiving, at the computing platform, at least a portion of the identification information from each device in the plurality of devices. At least the portion of the identification information comprises data indicative of an identity of an end-user associated with the device.

In another example embodiment, the example method can comprise generating a data structure indicative of at least one of a specific arrangement of the plurality of occupants within the enclosure or identities of the plurality of occupants within the enclosure. In addition or in the alternative, in other embodiments, the example method can comprise registering, by the computing platform, each of the plurality of devices prior to determining the number of occupants in the plurality of occupants in the enclosure, wherein the registering permits communicating wirelessly between the computing platform and each device. In yet other embodiments, the example method can comprise receiving, at the computing platform, from each of the plurality of devices, a device location and at least one positioning metric, wherein each positioning metric of the at least one positioning metric is indicative of a likelihood that a device associated with the positioning metric is positioned at a specific occupant location. In one aspect, generating the plurality of second locations comprises transmitting information indicative of each of the plurality of occupant locations to each of the plurality of devices.

In certain embodiments, the example method also can include validating, by the computing platform, an identity and an occupant location of an occupant of the plurality of occupants. Validating the identity and the occupant location of such occupant can comprise receiving, at the computing platform, confirmation information from a device associated with the occupant, the confirmation information comprises data indicative of the accuracy of the identity and the occupant location. In addition or in the alternative, validating the identity and the occupant location of such occupant can comprise receiving, at the computing platform, rectification information from a device associated with the occupant, the rectification information comprises data indicative of an adjustment to at least one of the identity or the occupant location.

In another example embodiment, the disclosure also can provide another example method for determining device location. Such example method, which is referred to as the second example method, can comprise acquiring, at a computing device (e.g., device 610), inertial sensor information indicative of a first position within an enclosure; acquiring, at the computing device, pilot information indicative of a second position within the enclosure; and generating, by the computing device, a device location estimate for the computing device based at least in part on at least a portion of the inertial sensor information and at least a portion of the pilot information, the device location estimate is indicative of a position within the enclosure.

In addition or in the alternative, in certain embodiments, the second example method can comprise generating, by the computing device, at least one positioning metric based at least in part on at least the portion of the inertial sensor information and at least the portion of the pilot information. Each positioning metric of the at least one positioning metric can be indicative of a likelihood that the computing device is at a specific position within the enclosure.

In another embodiment, the second example method can comprise transmitting at least a portion of the inertial sensor information to a device. In addition or alternative embodiments, the second example method can comprise registering the computing device with a computing platform (e.g., the IRM system 110) prior to acquiring the pilot information. The registering can permit communicating wirelessly between the computing platform and the computing device. The communicating can comprise transmitting, to the computing platform, identification information indicative of an identity of an end-user associated with a device of a plurality of devices within the enclosure.

Furthermore or as another alternative, in certain embodiments, the second example method can comprise transmitting the device location estimate to the computing platform. Transmitting the device location estimate to the computing platform can comprise transmitting one or more of facial recognition information associated with the at least one end-user, or audio-based recognition information associated with the at least one end-user.

In another example, the disclosure can provide an example apparatus for occupancy assessment. The example apparatus can comprise at least one memory (memory 930 and/or memory 1030) having computer-executable instructions (e.g., occupancy assessment component(s) 936 and/or occupancy assessment component(s) 1036) and information objects stored thereon; and at least one processor (e.g., processor(s) 914 and/or processor(s) 1014) functionally coupled to the memory and configured, by the computer-executable instructions and the information objects, to determine a number of occupants in a plurality of occupants of an enclosure; to generate a plurality of occupant locations within the enclosure, each of the plurality of occupant locations is associated with an occupant in the plurality of occupants; to generate a plurality of device locations within the enclosure, each of a plurality of device locations is associated with a device in a plurality of devices respectively associated with the plurality of occupants; to map each of the plurality of occupant locations to a respective device location in the plurality of device locations, and, in response, to associate each of the plurality of devices to a respective occupant of the plurality of occupants; and to assign an identity to each occupant of the plurality of occupants based at least on identification information indicative of an identity of at least one end-user respectively associated with at least one device of the plurality of devices.

In certain embodiments of the example apparatus, the at least one processor can be further configured to receive at least a portion of the identification information from each device in the plurality of devices, information comprising data indicative of an identity of an end-user associated with the device. In other embodiments of the example apparatus, the at least one processor can be further configured to generate a data structure indicative of at least one of a specific arrangement of the plurality of occupants within the enclosure or identities of the plurality of occupants within the enclosure. In still other embodiments of the example apparatus, the at least one processor can be further configured to register each of the plurality of devices prior to determining the number of occupants in the plurality of occupants in the enclosure. The registering permits communicating wirelessly between the computing platform and each device.

In one embodiment of the example apparatus, the at least one processor can be further configured to receive, from each of the plurality of devices, a device location and at least one positioning metric, wherein each positioning metric of the at least one positioning metric is indicative of a position likelihood that a device associated with the positioning metric is positioned at a specific occupant location. In additional or alternative embodiments of the apparatus, the at least one processor is further configured to transmit information indicative of each of the plurality of occupant locations to each of the plurality of devices.

In certain embodiments of the example apparatus, the at least one processor can be further configured to validate an identity and an occupant location of an occupant of the plurality of occupants. In other embodiments of the apparatus, the at least one processor can be further configured to receive confirmation information from a device associated with the occupant, the confirmation information comprises data indicative of the accuracy of the identity and the occupant location.

In other embodiments of the apparatus, the at least one processor can be further configured to receive rectification information from a device associated with the occupant. The rectification information comprises data indicative of an adjustment to at least one of the identity or the occupant location. In yet other embodiments of the example apparatus, the at least one processor can be further configured to ascertain a number of seats within the enclosure that are occupied based at least in part on pressure sensor information indicative of at least one seat within the enclosure being occupied.

In one embodiment of the example apparatus, the at least one processor can be further configured to access imaging information indicative of at least two seats within the enclosure being occupied. The imaging information can be accessed from one or more cameras having points of view directed to the interior of the enclosure (e.g., vehicle 204).

In another example, the disclosure can provide an example device to estimate device location. The example device can be a computing device (such as device 610) and can comprise at least one memory (e.g., memory 644) having computer-executable instructions (e.g., functionality instruction(s) storage 646) and information objects stored thereon (functionality information storage 648). In addition, the example device can comprise at least one processor functionally coupled to the memory and configured, by the computer-executable instructions and the information objects, to acquire inertial sensor information indicative of a first position within an enclosure; to acquire pilot information indicative of a second position within the enclosure; and to generate a device location estimate for the computing device based at least in part on at least a portion of the inertial sensor information and at least a portion of the pilot information, the device location estimate is indicative of a position within the enclosure.

In certain embodiments of the example device, the at least one processor is further configured to generate at least one positioning metric based at least in part on at least the portion of the inertial sensor information and at least the portion of the pilot information, wherein each positioning metric of the at least one positioning metric is indicative of a likelihood that the computing device is at a specific position within the enclosure. In additional or alternative embodiments of the example device, the at least one processor can be further configured to transmit at least a portion of the inertial sensor information to another device.

In other embodiment of the example device, the at least one processor can be further configured to register the device with a computing platform prior to acquisition of pilot information, wherein registration with the computing platform permits wireless communication between the computing platform and the device. In additional or alternative embodiments of the example device, the at least one processor can be further configured to communicate the device location estimate to the computing platform.

In certain embodiments of the example device, the at least one processor can be further configured to communicate, to the computing platform, identification information indicative of an identity of an end-user associated with a device in a plurality of devices within the enclosure. In other embodiments of the example device, the at least one processor can be further configured to transmit one or more of facial recognition information associated with the at least one end-user, or audio-based recognition information associated with the at least one end-user.

In another example, the disclosure provides another example apparatus that assesses occupancy. Such apparatus is referred to as a second example apparatus and can comprise means for determining a number of occupants in a plurality of occupants of an enclosure. In other embodiments of the second example apparatus the means for determining the number of occupants in the plurality of occupants of the enclosure can comprise means for ascertaining a number of seats within the enclosure that are occupied. In additional or alternative embodiments, the means for ascertaining comprises means for acquiring pressure sensor information indicative of at least two seats within the enclosure being occupied. Furthermore or as another alternative, the means for ascertaining can comprise means for accessing imaging information indicative of at least two seats within the enclosure being occupied, the imaging information is acquired at least in part from a camera having a field of view directed to the interior of the enclosure.

In addition, the second example apparatus can comprise means for generating a plurality of occupant locations within the enclosure, for each of the plurality of occupant locations is associated with an occupant in the plurality of occupants; means for generating a plurality of device locations within the enclosure, each of the plurality of device locations is associated with a device in a plurality of devices respectively associated with the plurality of occupants; means for mapping each of the plurality of occupant locations to a respective device location of the plurality of device locations; means for associating each of the plurality of devices to a respective occupant of the plurality of occupants based at least in part on the mapping; and means for assigning an identity to each occupant of the plurality of occupants based at least on identification information indicative of an identity of at least one end-user respectively associated with at least one device of the plurality of devices.

In other embodiments of the second example apparatus, the means for assigning can comprise means for receiving at least a portion of the identification information from each device in the plurality of devices. The identification information can comprise data indicative of an identity of an end-user associated with the device. In addition or alternative embodiments, the second example apparatus also can comprise means for generating a data structure indicative of at least one of a specific arrangement of the plurality of occupants within the enclosure or identities of the plurality of occupants within the enclosure. In addition or in the alternative, the second example apparatus also can comprise means for registering each of the plurality of devices prior to determining the number of occupants in the plurality of occupants in the enclosure. The means for registering can permit communicating wirelessly between the computing platform and each device.

In certain embodiments, the second example apparatus also can comprise means for receiving, from each of the plurality of devices, a device location and at least one positioning metric, wherein each positioning metric of the at least one positioning metric is indicative of a likelihood that a device associated with the positioning metric is positioned at a specific occupant location. In one aspect, the means for generating the plurality of second locations can comprise means for transmitting information indicative of each of the plurality of occupant locations to each of the plurality of devices.

In one embodiment, the second example apparatus can comprise means for validating an identity and an occupant location of an occupant of the plurality of occupants. In one aspect, the means for validating can comprise means for receiving confirmation information from a device associated with the occupant, the confirmation information comprises data indicative of the accuracy of the identity and the occupant location. In addition or in the alternative, the means for validating can comprise means for receiving rectification information from a device associated with the occupant, the rectification information comprises data indicative of an adjustment to at least one of the identity or the occupant location.

In yet another example, the disclosure provide yet another example apparatus that can determine device location. Such apparatus can be referred to as a third example apparatus and can comprise means for acquiring inertial sensor information indicative of a first position within an enclosure; means for acquiring pilot information indicative of a second position within the enclosure; and means for generating a device location estimate for the computing device based at least in part on at least a portion of the inertial sensor information and at least a portion of the pilot information, the device location estimate is indicative of a position within the enclosure.

In certain embodiments, the third example apparatus also can comprise means for generating at least one positioning metric based at least in part on at least the portion of the inertial sensor information and at least the portion of the pilot information, wherein each positioning metric of the at least one positioning metric is indicative of a likelihood that the computing device is at a specific position within the enclosure.

In other embodiments, the third example apparatus can comprise means for transmitting at least a portion of the inertial sensor information to a device. In addition or in the alternative, the third example apparatus can comprise means for registering the apparatus with a computing platform prior to acquiring the pilot information, wherein the means for registering permits communicating wirelessly between the computing platform and the computing device. In some embodiments, the third example apparatus also can comprise means for transmitting the device location estimate to the computing platform. In one embodiment, the means for communicating can comprise means for transmitting, to the computing platform, identification information indicative of an identity of an end-user associated with a device in a plurality of devices within the enclosure. In another embodiment, the means for transmitting can comprise means for transmitting one or more of facial recognition information associated with the at least one end-user, or audio-based recognition information associated with the at least one end-user.

In still another example, the disclosure can provide at least one example computer-readable non-transitory storage medium having instructions (e.g., occupancy assessment component(s) 936) for assessing occupancy encoded thereon. Such instructions, in response to execution, can cause at least one computing device (e.g., IRM system 110, or computing device 910 and/or computing device 1010) to perform operations comprising determining a number of occupants in a plurality of occupants of an enclosure. In certain embodiments of the at least one computer-readable non-transitory storage medium, determining the number of occupants in the plurality of occupants of the enclosure comprises ascertaining a number of seats within the enclosure that are occupied. In other embodiments of the at least one computer-readable non-transitory storage medium, the ascertaining can comprise acquiring pressure sensor information indicative of at least two seats within the enclosure being occupied. In additional or alternative embodiments of the at least one computer-readable non-transitory medium, the ascertaining can comprise accessing imaging information indicative of at least two seats within the enclosure being occupied.

In addition, the at least one example computer-readable non-transitory storage medium can comprise generating a plurality of occupant locations, each of the plurality of occupant locations is associated with an occupant in the plurality of occupants; generating a plurality of device locations, each of the plurality of device locations is associated with a device in a plurality of devices within the enclosure; mapping each of the plurality of occupant locations to a respective device location of the plurality of device locations, the mapping comprises associating each of the plurality of devices to a respective occupant of the plurality of occupants; and assigning an identity to each occupant of the plurality of occupants based at least on identification information indicative of an identity of at least one end-user respectively associated with at least one device of the plurality of devices.

In certain embodiments of the at least one example computer-readable non-transitory medium, the assigning can comprises receiving at least a portion of the identification information from each device in the plurality of devices, at least the portion of the identification information comprises data indicative of an identity of an end-user associated with the device. In additional or alternative embodiments of the at least one example computer-readable non-transitory medium, the operations further comprising generating a data structure indicative of at least one of a specific arrangement of the plurality of occupants within the enclosure or identities of the plurality of occupants within the enclosure.

In other embodiments of the at least one example computer-readable non-transitory storage medium, the operations further comprising registering each of the plurality of devices prior to generating the plurality of device locations, wherein the registering permits communicating wirelessly between the computing platform and each device.

In yet other embodiments of the at least one example computer-readable non-transitory medium, the operations further comprising receiving from each of the plurality of devices, a device location and at least one positioning metric, wherein each positioning metric of the at least one positioning metric is indicative of a likelihood that a device associated with the positioning metric is positioned at a specific occupant location.

In certain embodiments of the at least one computer-readable non-transitory storage medium, generating the plurality of device locations can comprise transmitting information indicative of each of the plurality of occupant locations to each of the plurality of devices. In additional or alternative embodiments of the at least one computer-readable non-transitory storage medium, the operations also can comprise validating an identity and an occupant location of an occupant of the plurality of occupants. In one aspect, the validating can comprise receiving confirmation information from a device associated with the occupant, the confirmation information comprises data indicative of the accuracy of the identity and the occupant location. In another aspect, the validating can comprise receiving rectification information (e.g., a correction or an adjustment) from a device associated with the occupant, the rectification information comprises data indicative of an adjustment to at least one of the identity or the occupant location.

In yet another example, the disclosure can provide at least one other example computer-readable non-transitory storage medium having instructions for determining device location encoded thereon that, in response to execution, cause at least one computing device to perform operations comprising acquiring inertial sensor information indicative of a first position within an enclosure; acquiring pilot information indicative of a second position within the enclosure; and generating a device location estimate for a computing device of the at least one computing device based at least in part on at least a portion of the inertial sensor information and at least a portion of the pilot information, the device location estimate is indicative of a position within the enclosure.

In certain embodiments of the least one other computer-readable non-transitory storage medium, the operations also can comprise generating at least one positioning metric based at least in part on at least the portion of the inertial sensor information and at least the portion of the pilot information, wherein each positioning metric of the at least one positioning metric is indicative of a likelihood that the computing device is at a specific position within the enclosure.

In other embodiments of the least one other computer-readable non-transitory storage medium, the operations also can comprise transmitting at least a portion of the inertial sensor information to a device. In additional or alternative embodiments of the least one computer-readable non-transitory medium, the operations also can comprise registering the at least one computing device with a computing platform prior to acquiring the pilot information, wherein the registering permits communicating wirelessly between the computing platform and the computing device.

In yet other embodiments of the at least one other computer-readable non-transitory medium, the operations also can comprise transmitting the device location estimate to the computing platform. In additional or alternative embodiments of the at least one other computer-readable non-transitory medium, the communicating can comprise transmitting, to the computing platform, identification information indicative of an identity of an end-user associated with a device of a plurality of devices within the enclosure.

In some embodiments of the at least one other computer-readable non-transitory medium, the transmitting can comprise transmitting one or more of facial recognition information associated with the at least one end-user, or audio-based recognition information associated with the at least one end-user.

Various advantages of the disclosure over conventional technologies for vehicle occupancy assessment emerge from the present specification and annexed drawings. As one example advantage, a number of novel and compelling experiences could be enabled such as collaborative media experience, games that are position dependent, and routing of information to the person most suitable (e.g., navigation information to the passenger in the front seat (if not a child, for example)), and the like. As another example advantage, knowledge of occupants' positions in the vehicle can be leveraged to automatically show content on the screen in the back of the seat and/or potentially in a side window of a vehicle for augmented reality (AR) applications) related to an occupant's profile and interests.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read only memory (ROM); random access memory (RAM); magnetic disk storage media; optical storage media; flash memory, etc.

Embodiments of the operational environments and methods (or techniques) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into onto a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "pipe," "module," and the like are intended to refer to a computer-related entity or an entity related to an operational apparatus with one or more specific functionalities. Such entities may be either hardware, a combination of hardware and software, software, or software in execution.

As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that provides, at least in part, the functionality of the electronic components. An interface can include input/output (I/O) components as well as associated processor, application, and/or other programming components. The terms "component," "environment," "system," "architecture," "interface," "unit," "pipe," and "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance the performance of user equipment or other electronic equipment.

In addition, in the present specification and annexed drawings, terms such as "store," storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that can provide vehicular occupancy assessment. It is, of course, not possible to describe every conceivable combination of elements and/or methods for purposes of describing the various features of the disclosure, but it can be recognize that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. An apparatus for device identification and mapping in an enclosure, comprising:
one or more sensors associated with the enclosure;
an antenna configured to receive a wireless signal from a first device of a plurality of devices, wherein the wireless signal is associated with a signal strength;
at least one memory having computer-executable instructions and information objects stored thereon; and
at least one processor functionally coupled to the antenna and the at least one memory and configured, by the computer-executable instructions and the information objects, to:
collect, by the at least one processor, data from the one or more sensors associated with the enclosure, wherein the data is indicative of a presence of a first occupant of one or more occupants of the enclosure;
determine, by the at least one processor and based on the data collected from the one or more sensors, a location of the first occupant;
determine, by the at least one processor and based on the signal strength and the location of the first occupant, a location of the first device;
generate, by the at least one processor, a data structure representing a mapping of the location of the first occupant and the location of the first device;
associate, by the at least one processor and based on the data structure, the first occupant with the first device;
assign, by the at least one processor and based on identification information, a first identity to the first occupant, wherein the identification information is indicative of a first end-user being associated with the first device;
receive, by the at least one processor, confirmation information from the first device, wherein the confirmation information is indicative of an accuracy of the assigned first identity; and
generate, by the at least one processor and based on the assigned first identity, content for presentation to the first end-user.

2. The apparatus of claim 1, wherein the at least one processor is further configured to receive at least a portion of the identification information from the first device.

3. The apparatus of claim 1, wherein the data structure is a first data structure, and the at least one processor is further configured to generate a second data structure indicative of a specific arrangement of the one or more occupants within the enclosure or identities of the one or more occupants within the enclosure.

4. The apparatus of claim 1, wherein the at least one processor is further configured to register the first device prior to determining the location of the first device, wherein the registering permits communicating wirelessly between the apparatus and the first device.

5. The apparatus of claim 4, wherein the at least one processor is further configured to receive, from the first device, the location of the first device and at least one positioning metric, wherein the at least one positioning metric is indicative of a likelihood that the first device is positioned at a specific occupant location.

6. The apparatus of claim 4, wherein the at least one processor is further configured to transmit information indicative of the location of the first occupant to the first device.

7. The apparatus of claim 1, wherein the at least one processor is further configured to ascertain a number of seats within the enclosure that are occupied based on pressure sensor information indicative of at least one seat within the enclosure being occupied, wherein the pressure sensor information is measured by the one or more sensors.

8. The apparatus of claim 7, wherein the at least one processor is further configured to access imaging information indicative of at least two seats within the enclosure being occupied, wherein the imaging information is measured by the one or more sensors.

9. At least one computer-readable non-transitory storage medium having instructions for device identification and mapping in an enclosure encoded thereon that, in response to execution, cause at least one computing device to perform operations comprising:
collecting data from one or more sensors associated with the enclosure, wherein the data is indicative of a presence of a first occupant of one or more occupants of the enclosure;
determining, based on the data collected from the one or more sensors, a location of the first occupant;
determining, based on a signal strength and the location of the first occupant, a location of a first device of a plurality of devices, wherein the signal strength is associated with a wireless signal received by an antenna, wherein the wireless signal is received from the first device;
generating a data structure representing a mapping of the location of the first occupant and the location of the first device;
associating, based on the data structure, the first occupant with the first device;
assigning, based on identification information, a first identity to the first occupant, wherein the identification information is indicative of a first end-user being associated with the first device;
receiving confirmation information from the first device, wherein the confirmation information is indicative of an accuracy of the assigned first identity; and
generating, based on the assigned first identity, content for presentation to the first end-user.

10. The at least one computer-readable non-transitory storage medium of claim 9, wherein the assigning comprises receiving at least a portion of the identification information from the first device.

11. The at least one computer-readable non-transitory storage medium of claim 9, wherein the data structure is a first data structure, and wherein the operations further comprise generating a second data structure indicative of a specific arrangement of the one or more occupants within the enclosure or identities of the one or more occupants within the enclosure.

12. The at least one computer-readable non-transitory storage medium of claim 9, the operations further comprising registering the first device prior to determining the location of the first device, wherein the registering permits communicating wirelessly between a computing platform and the first device.

13. The at least one computer-readable non-transitory storage medium of claim 12, the operations further comprising receiving, from the first device, the location of the first device and at least one positioning metric, wherein the at least one positioning metric is indicative of a likelihood that first device is positioned at a specific occupant location.

14. The at least one computer-readable non-transitory storage medium of claim 12, wherein generating the location of the first device comprises transmitting information indicative the location of the first occupant to the first device.

15. The at least one computer-readable non-transitory storage medium of claim 9, wherein determining the location of the first occupant comprises ascertaining a number of seats within the enclosure that are occupied.

* * * * *